United States Patent
Serov et al.

(10) Patent No.: US 9,634,331 B2
(45) Date of Patent: Apr. 25, 2017

(54) NON-PGM CATHODE CATALYSTS FOR FUEL CELL APPLICATION DERIVED FROM HEAT TREATED HETEROATOMIC AMINES PRECURSORS

(75) Inventors: Alexey Serov, Albuquerque, NM (US); Barr Halevi, Albuquerque, NM (US); Kateryna Artyushkova, Albuquerque, NM (US); Plamen B Atanassov, Santa Fe, NM (US); Ulises A Martinez, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 662 days.

(21) Appl. No.: 14/126,788

(22) PCT Filed: Jun. 15, 2012

(86) PCT No.: PCT/US2012/042609
§ 371 (c)(1),
(2), (4) Date: Jan. 21, 2015

(87) PCT Pub. No.: WO2012/174344
PCT Pub. Date: Dec. 20, 2012

(65) Prior Publication Data
US 2016/0181621 A1    Jun. 23, 2016

Related U.S. Application Data

(60) Provisional application No. 61/497,444, filed on Jun. 15, 2011, provisional application No. 61/606,109, (Continued)

(51) Int. Cl.
*B01J 23/72* (2006.01)
*B01J 23/745* (2006.01)
(Continued)

(52) U.S. Cl.
CPC .......... *H01M 4/8652* (2013.01); *B01J 23/70* (2013.01); *B01J 23/8892* (2013.01);
(Continued)

(58) Field of Classification Search
CPC .. H01M 4/9091; H01M 4/921; H01M 4/8885; H01M 4/9041; B01J 23/72;
(Continued)

(56) References Cited

U.S. PATENT DOCUMENTS

| 5,240,893 A | 8/1993 | Witherspoon |
| 7,678,728 B2 | 3/2010 | Olson et al. |

(Continued)

FOREIGN PATENT DOCUMENTS

| CN | 1635654 A | 7/2005 |
| JP | 2007136283 | 6/2007 |

(Continued)

OTHER PUBLICATIONS

"A mechanistic study of 4-aminoantipyrine and iron derived non-platinum group metal catalyst on the oxygen reduction reaction," Michael H. Robson et al. Electrochimica Acta 90 (2013), pp. 656-665.*

(Continued)

*Primary Examiner* — Patricia L Hailey
(74) *Attorney, Agent, or Firm* — Gonzales Patent Services; Ellen M. Gonzales

(57) ABSTRACT

A method of preparing M-N—C catalysts utilizing a sacrificial support approach and inexpensive and readily available polymer precursors as the source of nitrogen and carbon is disclosed. Exemplary polymer precursors include non-porphyrin precursors with no initial catalytic activity. Examples of suitable non-catalytic non-porphyrin precursors include, but are not necessarily limited to low molecular weight precursors that form complexes with iron such as (Continued)

4-aminoantipirine, phenylenediamine, hydroxysuccinimide, ethanolamine, and the like.

16 Claims, 19 Drawing Sheets

Related U.S. Application Data filed on Mar. 2, 2012, provisional application No. 61/621,084, filed on Apr. 6, 2012, provisional application No. 61/621,095, filed on Apr. 6, 2012.

(51) Int. Cl.

| | | |
|---|---|---|
| *B01J 23/755* | (2006.01) | |
| *B01J 23/86* | (2006.01) | |
| *B01J 23/10* | (2006.01) | |
| *B01J 23/20* | (2006.01) | |
| *B01J 23/22* | (2006.01) | |
| *B01J 23/24* | (2006.01) | |
| *B01J 23/64* | (2006.01) | |
| *B01J 21/08* | (2006.01) | |
| *H01M 4/86* | (2006.01) | |
| *B01J 37/08* | (2006.01) | |
| *B01J 23/889* | (2006.01) | |
| *B01J 23/70* | (2006.01) | |
| *B01J 35/00* | (2006.01) | |
| *H01M 4/88* | (2006.01) | |
| *H01M 4/90* | (2006.01) | |

(52) U.S. Cl.
CPC .......... *B01J 35/0033* (2013.01); *B01J 37/084* (2013.01); *H01M 4/8621* (2013.01); *H01M 4/8885* (2013.01); *H01M 4/9041* (2013.01); *H01M 4/9083* (2013.01); *H01M 4/9091* (2013.01); *H01M 2004/8689* (2013.01)

(58) Field of Classification Search
CPC ........ B01J 23/745; B01J 23/755; B01J 23/83; B01J 23/8472; B01J 23/8476; B01J 23/86; B01J 23/862; B01J 23/866; B01J 23/868; B01J 23/88; B01J 23/883; B01J 23/885; B01J 23/888; B01J 23/8892; B01J 23/10; B01J 23/20; B01J 23/22; B01J 23/24; B01J 23/462; B01J 23/64; B01J 21/08; B01J 21/063; B01J 21/066; B01J 37/0018; B01J 37/082; B01J 37/084; B01J 37/086; B01J 20/3057; B01J 20/3078

USPC ....... 502/300, 304, 309, 312, 315, 318, 319, 502/321, 338
See application file for complete search history.

(56) References Cited

U.S. PATENT DOCUMENTS

| | | | |
|---|---|---|---|
| 9,248,442 | B2 | 2/2016 | Morishita et al. |
| 9,359,681 | B1* | 6/2016 | Serov ................. C25D 1/08 |
| 2004/0236157 | A1 | 11/2004 | Heilgendorff et al. |
| 2007/0265162 | A1* | 11/2007 | Zhang .................. B01J 21/18 |
| | | | 502/439 |
| 2008/0113859 | A1 | 5/2008 | Popov et al. |
| 2010/0048380 | A1 | 2/2010 | Calabrese |
| 2010/0167106 | A1* | 7/2010 | Pak .................... H01M 4/8814 |
| | | | 429/525 |
| 2011/0319257 | A1 | 12/2011 | Wood et al. |
| 2014/0349843 | A1* | 11/2014 | Patterson .......... H01M 4/9041 |
| | | | 502/182 |
| 2015/0180046 | A1* | 6/2015 | Serov ................. H01M 4/9016 |
| | | | 423/263 |
| 2015/0228985 | A1* | 8/2015 | Serov .................. B01J 23/745 |
| | | | 502/174 |

FOREIGN PATENT DOCUMENTS

| | | |
|---|---|---|
| JP | 20111224 | 1/2011 |
| KR | 1020090038638 A | 4/2009 |
| WO | 2005035841 A2 | 4/2005 |
| WO | 2009075038 A1 | 6/2009 |

OTHER PUBLICATIONS

Gang Wu et al., High Performance Electrocatalysts for Oxygen Reduction Derived from Polyaniline, Iron, and Cobalt, Science, vol. 33, pp. 443-447, Apr. 22, 2011.

Frederick Jaouen et al., Recent advances in non-precious metal catalysis for oxygen-reduction reaction in polymer electrolyte fuel cells, Energy & Environmental Science, vol. 4 pp. 114-130, Oct. 18, 2010.

Serov, A. et al. Highly active and durable templated non-PGM cathode catalysts derived from iron and aminoantipyrine, Electrochemistry Communications, May 28, 2012, vol. 22.

Garsuch et al, Fuel Cell Studies on a Non-Noble Metal Catalyst Prepared by a Template-Assisted Synthesis Route, Journal of the Electrochemical Society, vol. 155, No. 9, Jul. 18, 2008, p. B953.

S. Hwang et al.,"Preparation of Bimodal Porous Carbon Supported PtRu Catalysts for Fuel Cells" Fuel Cell, vol. 10, No. 2, 2010.

* cited by examiner

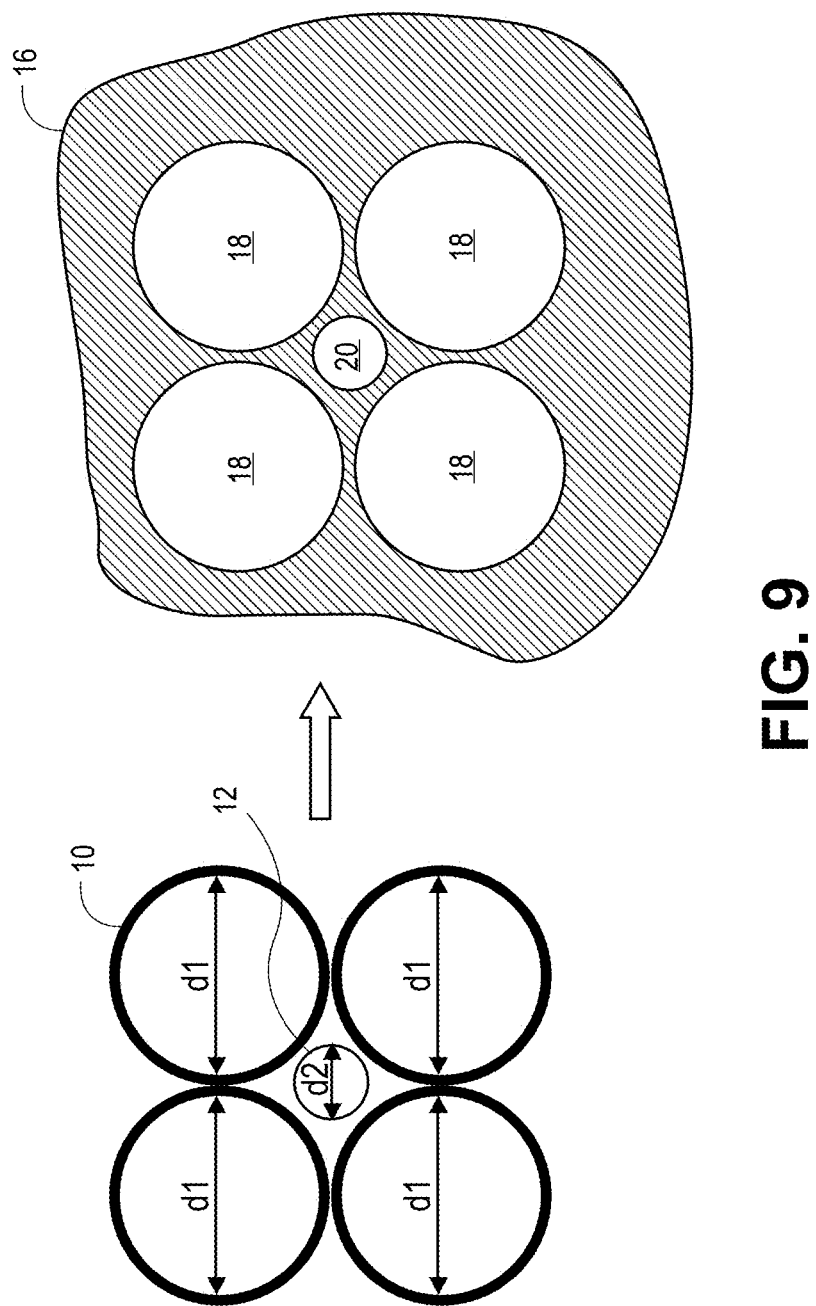

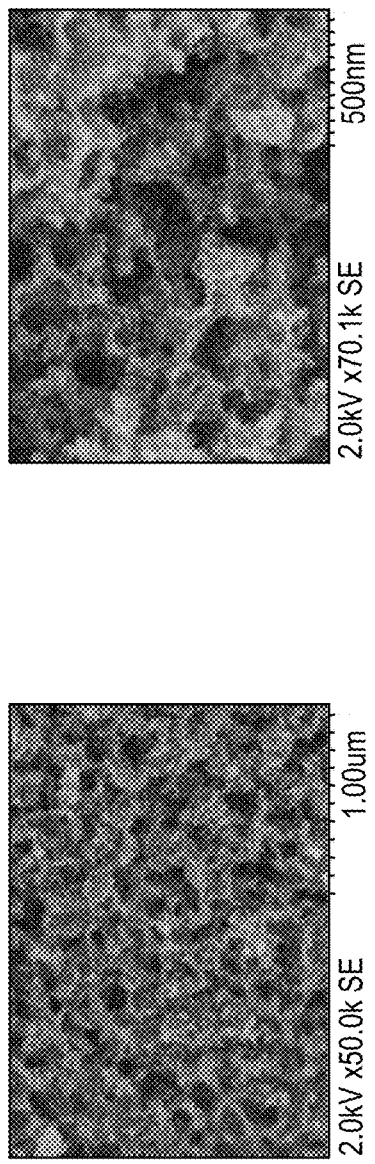
FIG. 34A
FIG. 34B
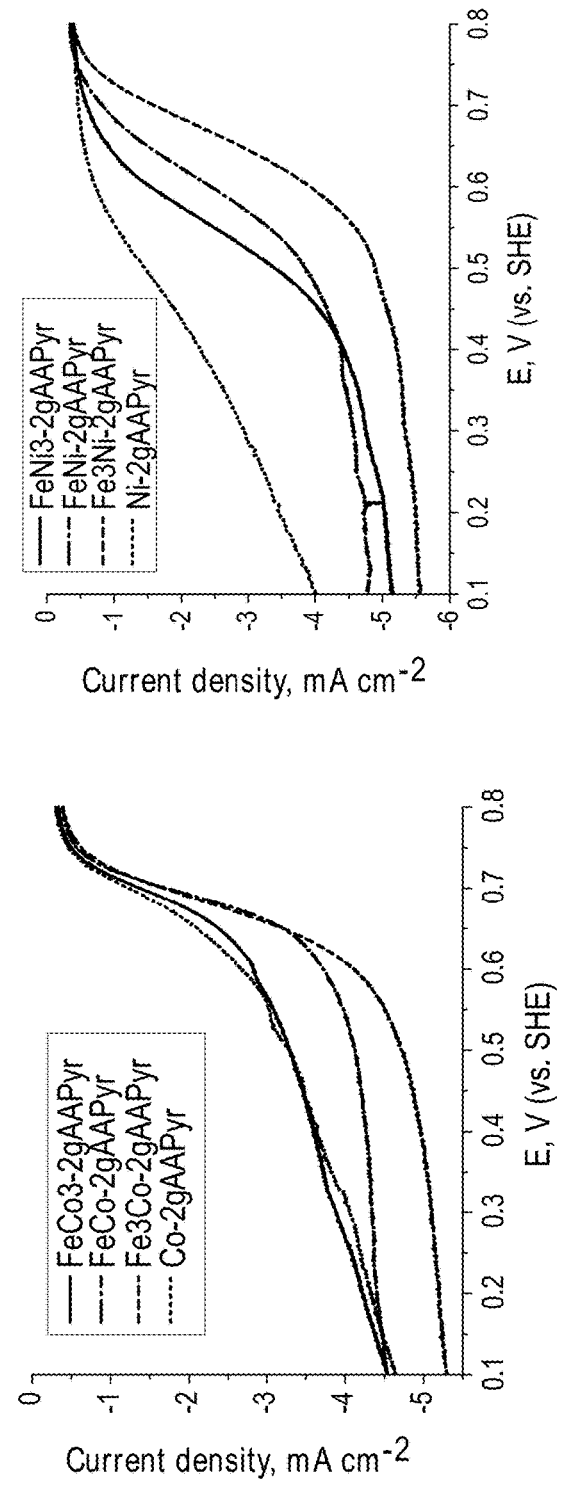
FIG. 35
FIG. 36

US 9,634,331 B2

NON-PGM CATHODE CATALYSTS FOR FUEL CELL APPLICATION DERIVED FROM HEAT TREATED HETEROATOMIC AMINES PRECURSORS

CROSS-REFERENCE TO RELATED APPLICATIONS

The following application is a 371 of International application No. PCT/US2012/042609, which claims benefit of U.S. Provisional Application Nos. 61/497,444, filed Jun. 15, 2011, 61/606,109, filed Mar. 2, 2012, 61/621,084, filed Apr. 6, 2012 and 61/621,095, filed Apr. 6, 2012, each of which is hereby incorporated by reference in its entirety.

STATEMENT REGARDING GOVERNMENT SPONSORED RESEARCH

This invention was made with Government support under Grant No. 503016-78051 awarded by the U.S. Department of Energy. The US. Government has certain rights in this invention.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Nobel metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

Generally, known non-platinum electrocatalysts are supported on high surface area carbon blacks. This is done to increase dispersion, active surface area, and conductivity of the catalytic layer. The synthesis procedure usually includes precipitation of the precursor molecules onto the supporting substrate and pyrolyzation of the supported precursor.

M-N—C catalysts have been found to be very promising for electrochemical oxygen reduction applications in fuel cell membrane electrode assemblies (MEAS), stacks and fuel cell systems. Critical aspects of the materials include the presence of metallic particles, conjugated carbon-nitrogen-oxide-metallic networks, and nitrogen-bonded carbon. The metallic phase includes metallic, oxide, carbide, nitride, and mixtures of these states. The chemical states and bonding of the N/C/M networks and N/C networks influences performance, for example, increased overall nitrogen content improves ORR performance. However, these systems still suffer from several significant drawbacks including: low stability in acidic environments, low durability in acid and alkaline environments, high costs of nitrogen precursors and low activity in ORR compared with platinum. The problem of low stability in acid is connected to leaching of metal from carbon-nitrogen network. Low durability in acid and alkaline solutions is explained by the evolution of significant amount of $H_2O_2$ in these environments which is corrosive for both metal and carbon-nitrogen networks. The low activity is possibly due to the low metal loading, and as a result in low concentration of active sites in such catalysts due to using external carbon source (high surface carbons like Vulcan, KetjenBlack etc).

A previously described pyrolysis-based methods for synthesizing unsupported M-N—C catalysts that overcame a number of the problems identified above involved templating a nitrogen and carbon containing porphyrins that are known to have some initial catalytic activity on a sacrificial support such as silica, pyrolyzing the templated support, and then removing the support, for example via etching. See e.g., U.S. Pat. No. 7,678,728 issued Mar. 15, 2010, which is hereby incorporated by reference.

SUMMARY

The M-N—C systems are known catalysts for oxygen reduction reaction (ORR). However, they possess a number of significant disadvantages including: low stability in acid media, low activity compared to conventional ORR catalyst (platinum), and high cost of precursors. In the present disclosure a method of preparation of M-N—C catalysts utilizing a sacrificial support approach and using inexpensive and readily available polymer precursors is described. The synthesized catalysts made using this approach perform well in both alkaline and acid media are highly durable, and inexpensive to manufacture.

BRIEF DESCRIPTION OF THE DRAWINGS

FIG. 9 is a schematic illustration of a method for producing catalysts having a multimodal pore size distribution, as described herein.

FIG. 34A is an SEM image of FeCuMn-AAPyr tri-metallic catalyst prepared using the methods described herein.

FIG. 34B is another SEM image of FeCuMn-AAPyr tri-metallic catalyst prepared using the methods described herein.

FIG. 35 is a Rotating Disc Electrode electro-voltamogram illustrating oxygen reduction for $Fe_xCo_y$-AAPyr bi-metallic catalysts compared to Co-AAPyr.

FIG. 36 is a Rotating Disc Electrode electro-voltamogram illustrating oxygen reduction for $Fe_xNi_y$-AAPyr bi-metallic catalysts compared to Ni-AAPyr.

DETAILED DESCRIPTION

Figure 1:
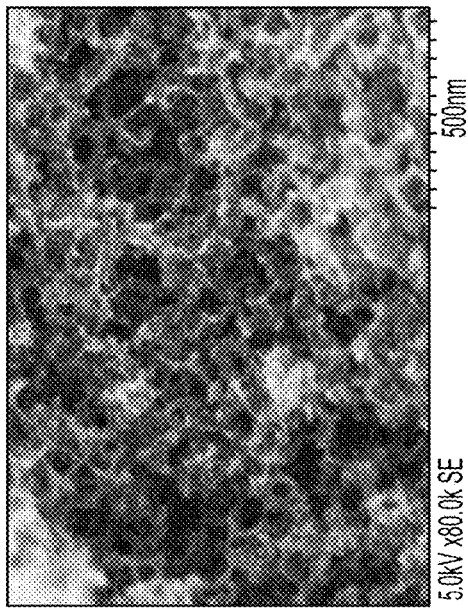
FIG. 1 is an X-ray diffractogram of an Fe-M-C catalyst prepared as described herein.

According to an embodiment the present disclosure provides novel catalysts and methods for making the same. In previously described methods for forming M-N—C catalysts, the source of nitrogen and carbon is typically a porphyrin precursor having an initial catalytic activity. This initial catalytic activity is them improved upon by complexing with metallic particles. The present disclosure relies on the surprising and unexpected discovery that M-N—C catalysts can be synthesized by using non-porphyrin precursors with no initial catalytic activity, as the source of nitrogen and carbon. Examples of suitable non-catalytic non-porphyrin precursors include, but are not necessarily limited to low molecular weight precursors that form complexes with iron such as 4-aminoantipirine, phenylenediamine, hydroxysuccinimide, ethanolamine, and the like. According to some embodiments, the non-catalytic precursors may be selected due to their ability to complex with iron. According to yet other embodiments, the non-catalytic precursors may be selected because they contain moieties that are the same or similar to the active sites in precursors that have initial catalytic activity, the crystal structure of which is then stabilized by means of high temperature heat treatment.

According to an embodiment, an M-N—C catalyst according to the present disclosure may be prepared via wet impregnation of iron precursors in the form of iron nitrate and C—N precursors in the form of 4-aminoantipirine (AAPyr) onto the surface of a sacrificial support of fumed silica. Other suitable iron precursors include, but are not limited to iron sulfate, iron acetate, iron chloride etc.

It will be appreciated that other transition metals such as Ce, Cr, Cu Mo, Ni, Ru, Ta, Ti, V, W, and Zr can be substituted in place of iron, by simply using precursors of those metals instead. Examplary transition metal precursors include, but are not limited to cerium nitrate, chromium nitrate, copper nitrate, ammonium molybdate, nickel nitrate, ruthenium chloride, tantalum isopropoxide, titanium ethoxide, vanadium sulfate, ammonium tunstanate and zirconium nitrate. Furthermore, according to some embodiments and as described in greater detail below, the presently described methodologies may utilize precursors of two or more metals to produce multi-metallic catalysts.

Suitable sacrificial supports include, but are not limited to silicas, zeolites, aluminas, and the like. The support may take the form of spheres, particles, or other two or three dimensional regular, irregular, or amorphous shapes. The spheres, particles, or other shapes may be monodisperse, or irregularly sized. The spheres, particles, or other shapes may or may not have pores and such pores may be of the same or different sizes and shapes.

It should be appreciated, and as described in greater detail below, the size and shape of the silica particles may be selected according to the desired shape(s) and size(s) of the voids within the electrocatalyst material. Accordingly, by selecting the particular size and shape of silica particles, one can produce a electrocatalyst having voids of a predictable size and shape. For example, if the silica particles are spheres, the electrocatalyst will contain a plurality of spherical voids. Those of skill in the art will be familiar with the electrocatalyst Pt—Ru black, which consists of a plurality of platinum-ruthenium alloy spheres. An electrocatalyst formed from using silica spheres with the above-described method looks like a negative image of the Pt—Ru black; the space that existed as a void in the Pt—Ru black is filled with metal electrocatalyst, and the space that existed as metal electrocatalyst in the Pt—Ru black is void.

As stated above, according to some embodiments, silica spheres of any diameter may be used. In some preferred embodiments, silica particles having an characteristic lengths of between 1 nm and 100 nm, in more preferred embodiments, silica particles having an characteristic lengths of between 100 nm and 1000 nm may be used and in other preferred embodiments, silica particles having an characteristic lengths of between 1 mm and 10 mm may be used. Further mesoporous silica can also be used in the templating synthesis approach. In this case the templating involves intercalating the mesopores of the material and results in a self-supported electrocatalysts with porosity in the 2-20 nm range. In one particular embodiment, the silica template is Cabosil amorphous fumed silica (325 $m^2$/g). As stated above, because the spheres serve as the template for the formation of the electrocatalyst, in an embodiment where silica particles having an average diameter of 20 nm is used, the spherical voids in the electrocatalyst will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

After deposition and/or impregnation of the C—N and metal precursors on the sacrificial support, the catalysts is heat treated either in an inert atmosphere such as $N_2$, Ar, or He, or in a reactive atmosphere such as $NH_3$ or acetonitrile. Inert atmospheres are typically used when the C—N precursor is nitrogen rich, as the inert atmosphere enables the production of a high number of active sites with Fe (or other metal) N4 centers. However, it may be desired to use a nitrogen rich atmosphere if the C—N precursor is rich in carbon and depleted in nitrogen, as the nitrogen rich atmosphere will enable production of the Fe (or other metal) N4 centers.

According to an embodiment, optimal temperatures for heat treatment are between 500 and 1100° C. According to some embodiments, heat treatment between 800 and 900° C. is preferred, as this temperature is high enough to pyrolize the material, but is typically not high enough to destroy the active sites.

After heat treatment, the sacrificial support is removed using suitable means. For example, the sacrificial support may be removed via chemical etching. Examples of suitable etchants include NaOH, KOH, and HF. According to some embodiments, it may be preferable to use KOH, as it preserves all metal and metal oxide in the catalyst and, if the species are catalytically active, use of KOH may, in fact, increase catalytic activity. Alternatively, in some embodiments, HF may be preferred as it is very aggressive and can be used to remove some poisonous species from the surface of the catalyst. Accordingly, those of skill in the art will be able to select the desired etchants based on the particular requirements of the specific catalytic material being formed.

According to a specific exemplary embodiment, Fe-AAPyr catalysts were prepared via wet impregnation of iron and aminoantipyrine precursors onto the surface of fumed silica (Cab-O-Sil™ EH-5, surface area: ~400 m$^2$ g$^{-1}$). First, 1 g of silica was dispersed in water using the sonobath. Then, a solution of 1 g of AAPyr in water was added to the silica, and sonicated for 20 minutes. Then, an aqueous solution of 1 g iron nitrate (Fe(NO$_3$)$_3$.9H$_2$O, Sigma-Aldrich) was added to the SiO$_2$-AAPyr solution and then sonicated for 8 hours in the sonobath. After sonication, a viscous solution of silica and Fe-AApyr was dried overnight at T=85° C. The solid was ground to a fine powder in an agate mortar, and then subjected to the heat treatment (HT). The conditions of HT were: UHP N$_2$ atmosphere flowing at a rate of 100 cc min$^{-1}$, HT temperatures of 800° C., HT temperature ramp rates of 10° C. min$^{-1}$, and HT durations of 1 hour.

Figure 2:
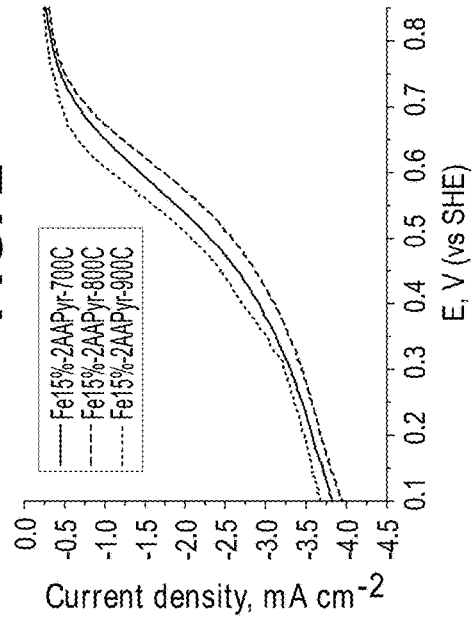
FIG. 2 is an SEM image of Fe-AApyr catalysts prepared using the methods described herein.

FIGS. 1-2 illustrate structural and morphological data for selected M-N—C catalysts prepared using the methods described herein.

FIG. 1 is an X-ray diffractogram illustrating that the Fe-M-C catalyst prepared from iron nitrate as a metal source and AAPyr as a source of nitrogen and carbon mainly consists of nanoparticles (less than 2 nm) of iron imbedded into a carbon matrix.

FIG. 2 is an SEM image of Fe-AApyr catalysts prepared using the methods described herein illustrating that this material possesses a highly developed porous structure with pore size of about 50-70 nm. The porosity is thought to improve catalytic properties towards oxygen reduction.

Figure 3:
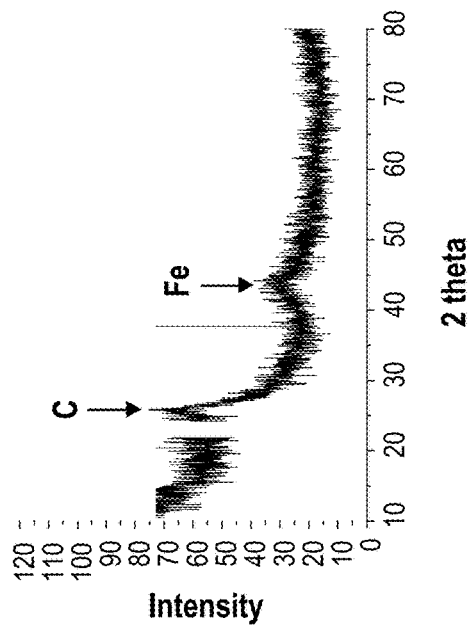
FIG. 3 is a Rotating Disc Electrode electro-voltamogram illustrating oxygen reduction for Fe-AApyr catalysts prepared using the methods described herein.
Figure 4:
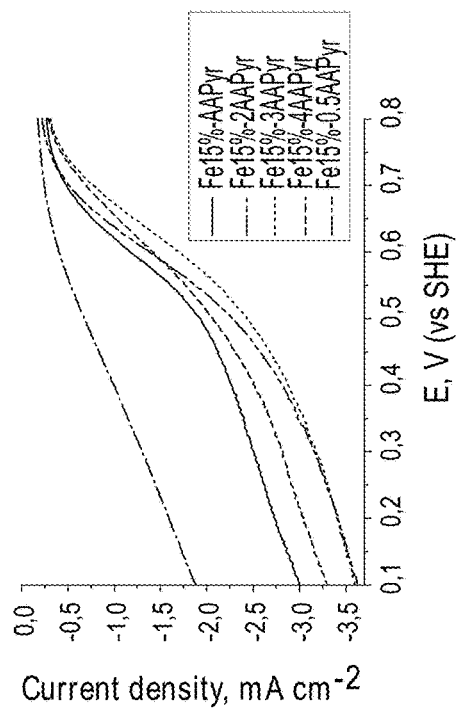
FIG. 4 is a Rotating Disc Electrode electro-voltamogram illustrating oxygen reduction for Fe-AAPyr prepared with a variety of heat treatment temperatures.

FIGS. 3 and 4 show the results of oxygen reduction tests and thus demonstrate the utility of the materials described herein.

FIG. 3 is a Rotating Disc Electrode electro-voltamogram illustrating oxygen reduction for Fe-AApyr catalysts prepared with different amounts of aminoantipiryne precursor in 0.5M H$_2$SO$_4$ saturated with O$_2$ (catalyst loading 160 mg cm$^{-2}$, 1600 RPM, scan rate 20 mV s$^{-1}$).

FIG. 4 is a Rotating Disc Electrode electro-voltamogram illustrating oxygen reduction for Fe-AAPyr prepared with a variety of heat treatment temperatures in 0.5M H$_2$SO$_4$ saturated with O$_2$ (catalyst loading: 160 mg cm$^{-2}$, 1600 RPM, scan rate 20 mV s$^{-1}$)

The reaction tests demonstrate that M-N—C catalysts prepared using inexpensive heteroatomic amines precursors and the methods disclosed herein, possess high activity in both alkaline and acid media, and should therefore also be active in neutral pH.

FIGS. 5-8 illustrate mechanistic studies of the catalysts prepared as described herein and show low H$_2$O$_2$ production yield, thus indicating a reaction pathway that proceeds via the more efficient 4 electron mechanism.

Figure 5:
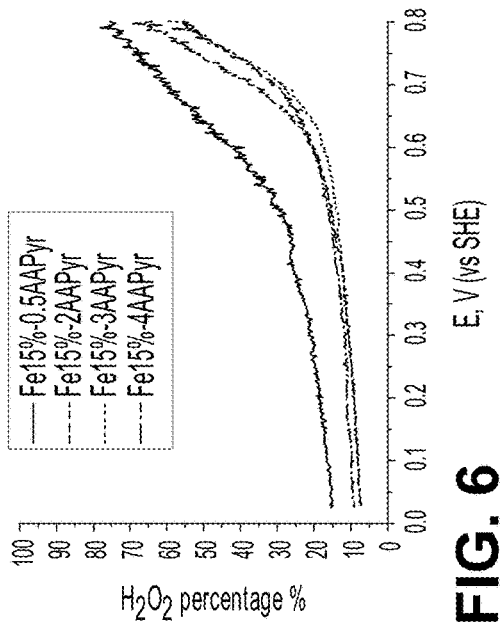
FIG. 5 is a graph of the number of electrons participating in ORR for a variety Fe-AAPyr catalysts prepared as described herein.

FIG. 5 is a graph of the number of electrons participating in ORR for Fe-AAPyr catalysts, with variation of the amount of aminoantipiryen precursor in 0.5M H$_2$SO$_4$ saturated with O$_2$ (catalyst loading: 160 mg cm$^{-2}$, 1600 RPM, 20 mV s$^{-1}$)

Figure 6:
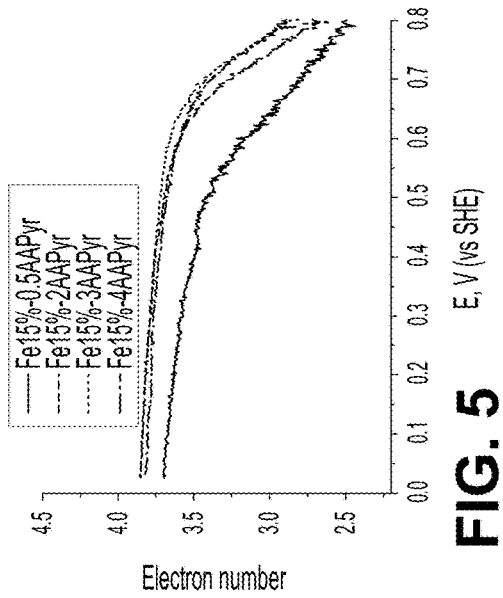
FIG. 6 is a graph of hydrogen peroxide yield for a variety of Fe-AAPyr catalysts prepared as described herein.

FIG. 6 is a graph of hydrogen peroxide yield for Fe-AAPyr catalysts prepared with different amounts of aminoantipiryen precursor in 0.5M H$_2$SO$_4$ saturated with O$_2$ (catalyst loading: 160 mg cm$^{-2}$, 1600 RPM, 20 mV s$^{-1}$).

Figure 7:
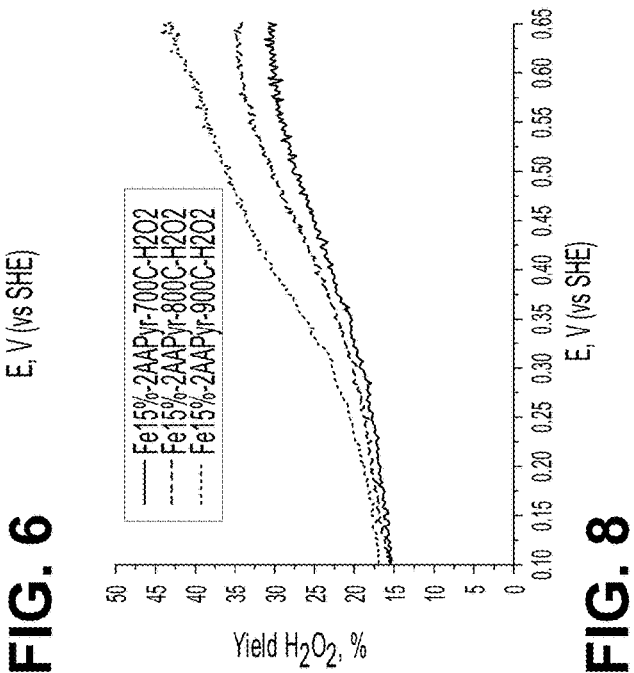
FIG. 7 is a graph of the number of electrons participating in ORR for Fe-AAPyr catalysts prepared as described herein.

FIG. 7 is a graph of the number of electrons participating in ORR for Fe-AAPyr catalysts prepared with variation of heat treatment temperature in 0.5M H$_2$SO$_4$ saturated with O$_2$ (catalyst loading: 160 mg cm$^{-2}$, 1600 RPM, 20 mV s$^-$)

Figure 8:
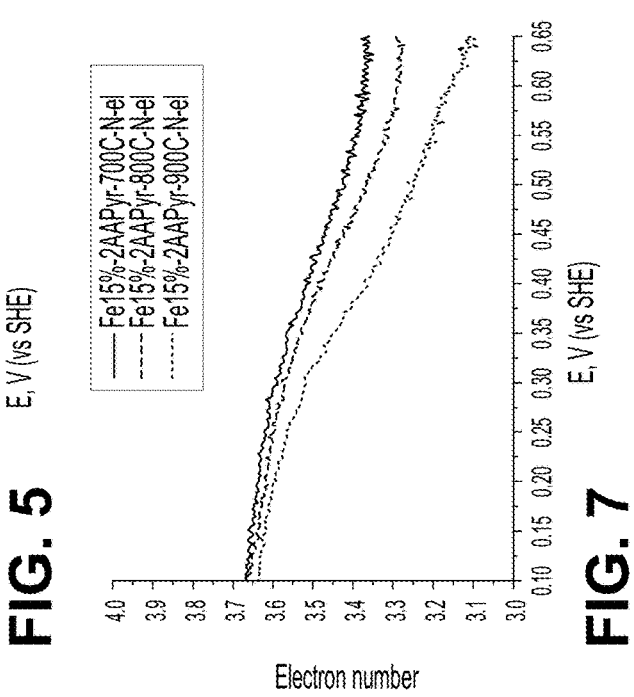
FIG. 8 is a graph of hydrogen peroxide yield for a variety of Fe-AAPyr catalysts prepared as described herein.

FIG. 8 is a graph of hydrogen peroxide yield for Fe-AAPyr prepared with variation of heat treatment temperature in 0.5M H$_2$SO$_4$ saturated with O$_2$ (catalyst loading: 160 mg cm$^{-2}$, 1600 RPM, 20 mV s$^{-1}$).

As stated above, the mechanism of oxygen reduction shows the direct reduction of oxygen to water by the preferred 4 electron pathway, thus avoiding corrosive peroxide production and therefore improving the stability and durability of the resulting catalysts.

As demonstrated in FIGS. 3, 5, and 6, the properties of the resulting catalyst can be varied by selecting the amount of nitrogen-containing precursor to use in the preparation method. In general, the higher concentration of nitrogen in the catalyst, the higher the activity in ORR. Furthermore, as demonstrated in FIGS. 4, 7 and 8, the properties of the catalysts can also be altered by varying the heat treatment temperature. It will be appreciated that it is desirable to optimize the heat treatment temperature for each combination of transition metals and C—N precursors, as too low a temperature will not create active sites, and too high a temperature will decompose the materials.

As mentioned above, the presently described methods can be used to produce catalysts from non-iron metals such as Co, Ni, Cu, Cr, Mn, and the like.

As a specific non-limiting example, Fe-AAPyr catalysts were prepared via wet impregnation of iron and aminoantipyrine precursors onto the surface of fumed silica (Cab-O-Sil™ EH-5, surface area: ~400 m$^2$ g$^{-1}$). First, 1 g of silica was dispersed in water using the sonobath. Then, a solution of 1 g of AAPyr in water was added to the silica, and sonicated for 20 minutes. Then, an aqueous solution of 1 g iron nitrate (Fe(NO$_3$)$_3$.9H$_2$O, Sigma-Aldrich) was added to the SiO$_2$-AAPyr solution and then sonicated for 8 hours in the sonobath. After sonication, a viscous solution of silica and Fe-AApyr was dried overnight at T=85° C. The solid was ground to a fine powder in an agate mortar, and then subjected to the heat treatment (HT). The conditions of HT were: UHP N$_2$ atmosphere flowing at a rate of 100 cc min$^{-1}$, HT temperatures of 800° C., HT temperature ramp rates of 10° C. min$^{-1}$, and HT durations of 1 hour.

According to yet another non-limiting example, Fe—Mn-AAPyr catalysts were prepared via wet impregnation of iron, manganese and aminoantipyrine precursors onto the surface of fumed silica (Cab-O-Sil™ EH-5, surface area: ~400 m$^2$ g$^{-1}$). First, 3 g of silica was dispersed in water using the sonobath. Then, a solution of 1.98 g of AAPyr in water was added to silica, and sonicated for 20 minutes. Then, an aqueous solution of 1.4 g iron nitrate ($Fe(NO_3)_3 \cdot 9H_2O$, Sigma-Aldrich) and 3.2 g of manganese nitrate were added to the $SiO_2$-AAPyr solution and then sonicated for 8 hours in the sonobath. After sonication, a viscous solution of silica and Fe—Mn-AApyr was dried overnight at T=85° C. The solid was ground to a fine powder in an agate mortar, and then subjected to the heat treatment (HT). The conditions of HT were: UHP $N_2$ atmosphere flowing at a rate of 100 cc $min^{-1}$, HT temperatures of 800° C., HT temperature ramp rates of 10° C. $min^{-1}$, and HT durations of 1 hour.

According to still another non-limiting embodiment, Fe—Cr-AAPyr catalysts were prepared via wet impregnation of iron and aminoantipyrine precursors onto the surface of fumed silica (Cab-O-Sil™ EH-5, surface area: ~400 $m^2$ $g^{-1}$). First, 2 g of silica was dispersed in water using the sonobath. Then, a solution of 3.5 g of AAPyr in water was added to the silica, and sonicated for 20 minutes. Then, an aqueous solution of 1 g iron nitrate ($Fe(NO_3)_3 \cdot 9H_2O$, Sigma-Aldrich) and 1.25 g of chromium nitrate were added to the $SiO_2$-AAPyr solution and then sonicated for 8 hours in the sonobath. After sonication, a viscous solution of silica and Fe-AApyr was dried overnight at T=85° C. The solid was ground to a fine powder in an agate mortar, and then subjected to the heat treatment (HT). The conditions of HT were: UHP $N_2$ atmosphere flowing at a rate of 100 cc $min^{-1}$, HT temperatures of 850° C., HT temperature ramp rates of 10° C. $min^{-1}$, and HT durations of 4 hour.

According to embodiment, the M-N—C catalysts described herein can be deposited onto conductive dispersed supports (both carbon and non-carbon) in a fashion that facilitates the charge transfer of the heteroatom atom and the support. According to some embodiments, usage of non-carbon support, like conductive Mo or W oxides can significantly decrease hydrogen peroxide production, increase durability and stability of catalysts in acid and alkaline media.

As described above, sacrificial supports of different sizes and shapes may be used together to produce catalysts having a variety of different morphologies. For example, in some embodiments it may be desirable to produce catalysts having multi-modal porosity, that is, where the catalyst comprises two or more distinct populations of pores, wherein each population consists of pores having an average diameter that is differentiable from the other population(s). For example, a catalyst that has one population of pores with an average diameter of approximately 10 nm, a second population of pores with an average diameter of approximately 50 nm and a third population of pores with an average diameter of between 150-200 nm would be considered to have a multi-modal pore size distribution.

Turning to FIG. 9, according to an embodiment, such multi-modal pore size distribution could be produced by templating the above-described precursors onto sacrificial supports formed from spheres (or otherwise shaped particles) having different diameters. As shown, larger spheres 10 having a diameter d1 and smaller spheres 12 having a diameter d2 are mixed together to form a sacrificial support on which the precursor materials are deposited and pyrolized. Once the support is removed, the resulting catalytic material 16 contains differently sized pores 18, 20 corresponding to the different particle diameters.

It will be appreciated that in order to have complete control over the morphology of the resulting catalytic material, it will be desirable to template the precursors into sacrificial supports with known shapes and sizes. According to a particular embodiment where the sacrificial support is formed from silica particles, the different shapes and sizes of sacrificial supports may be produced by using different types of silica to reliably and reproducibly produce differently sized silica particles. The resulting catalysts will then have a multi-modal pore distribution, where the specific size and shape of the pores is known.

According to a specific example, a catalyst as described herein formed on EH5 and LM130 silica was prepared via wet impregnation of iron and amino antipyrine precursors onto the surface of different fumed silicas and their mixtures (Cab-O-Sil™ surface areas 90-400 $m^2$ $g^{-1}$). First, 1 g of silica EH5 and 1 g of silica LM130 were dispersed in water using the sonobath. Then, a solution of 1 g of AAPyr in water was added to silica, and sonicated for 20 minutes. Then, an aqueous solution of 1 g iron nitrate ($Fe(NO_3)_3 \cdot 9H_2O$, Sigma-Aldrich) was added to the $SiO_2$-AAPyr solution and then sonicated for 8 hours in the sonobath. After sonication, a viscous solution of silica and Fe-AApyr was dried overnight at T=85° C. The solid was ground to a fine powder in an agate mortar, and then subjected to the heat treatment (HT). The conditions of HT were: UHP $N_2$ atmosphere flowing at a rate of 100 cc $min^{-1}$, HT temperatures of 800° C., HT temperature ramp rates of 10° C. $min^{-1}$, and HT durations of 1 hour.

According to yet another specific example, a catalyst as described herein formed on M5D and A90 silica was prepared via wet impregnation of iron and aminoantipyrine precursors onto the surface of different fumed silicas and their mixtures (Cab-O-Sil™ surface areas 90-400 $m^2$ $g^{-1}$). First, 2 g of silica M5D and 0.25 g of silica A90 were dispersed in water using the sonobath. Then, a solution of 1.3 g of AAPyr in water was added to silica, and sonicated for 20 minutes. Then, an aqueous solution of 4 g iron nitrate ($Fe(NO_3)_3 \cdot 9H_2O$, Sigma-Aldrich) was added to the $SiO_2$-AAPyr solution and then sonicated for 8 hours in the sonobath. After sonication, a viscous solution of silica and Fe-AApyr was dried overnight at T=85° C. The solid was ground to a fine powder in an agate mortar, and then subjected to the heat treatment (HT). The conditions of HT were: UHP $N_2$ atmosphere flowing at a rate of 100 cc $min^{-1}$, HT temperatures of 800° C., HT temperature ramp rates of 10° C. $min^{-1}$, and HT durations of 1 hour.

FIGS. 10-20 depict the morphological data for a various M-N—C catalysts having multi-modal porosity and prepared as described herein.

Figure 10B:
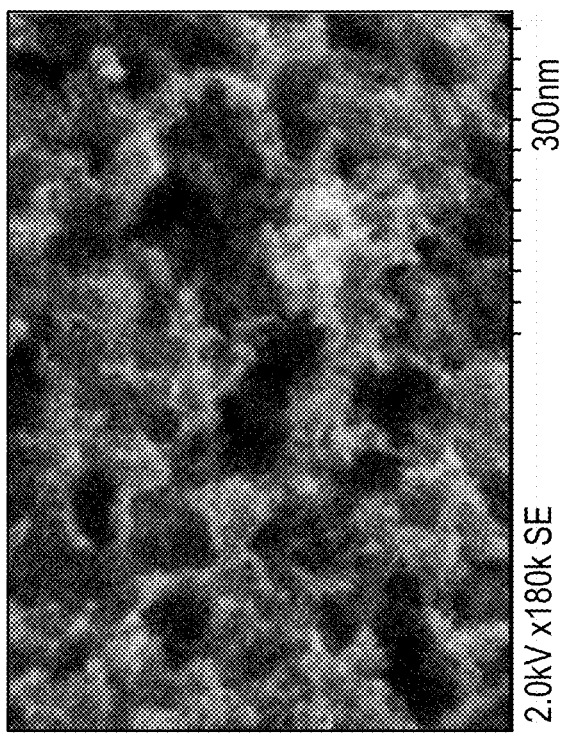
FIG. 10B is an SEM image of a mono-modal catalyst derived from Fe-AAPyr and HS5 silica with a scale bar at 300 nm.
Figure 10A:
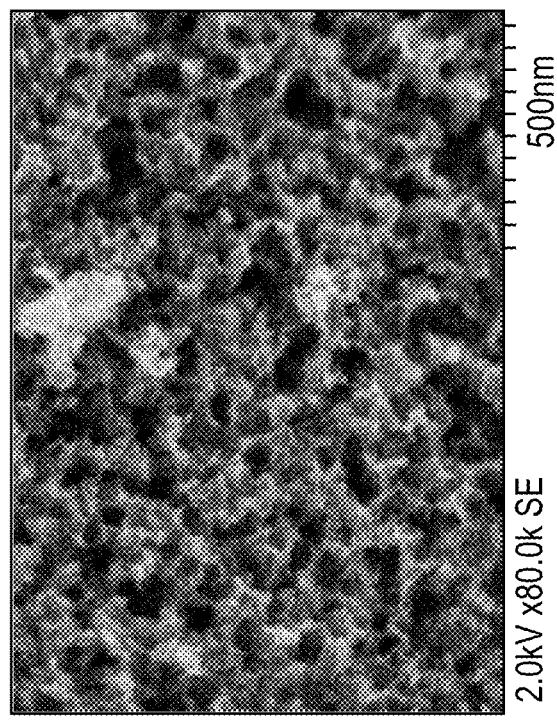
FIG. 10A is an SEM image of a mono-modal catalyst derived from Fe-AAPyr and HS5 silica with a scale bar at 500 nm.

FIG. 10 is an SEM image of a mono-modal catalyst derived from Fe-AAPyr and HS5 silica. It can be seen that pore size is in the range of 40-60 nm.

Figure 11B:
FIG. 11B is an SEM image of a bi-modal catalyst derived from Fe-AAPyr and M5 silica with a scale bar at 300 nm.
Figure 11A:
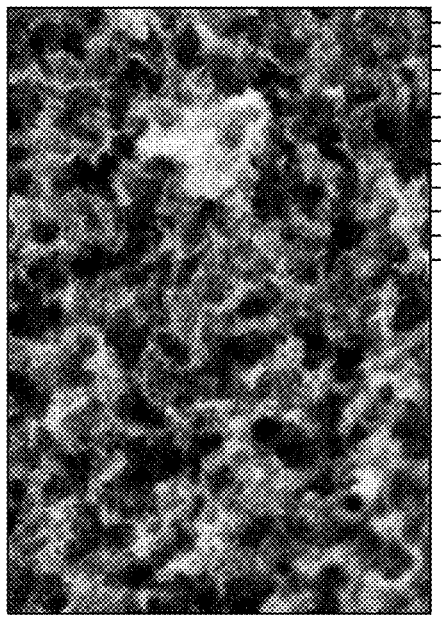
FIG. 11A is an SEM image of a bi-modal catalyst derived from Fe-AAPyr and M5 silica with a scale bar at 500 nm.

FIG. 11 is an SEM image of a bi-modal catalyst derived from Fe-AAPyr and M5 silica. It can be seen that first type of pores have diameter 40-60 nm, while second type of pores have diameter <10 nm.

Figure 12B:
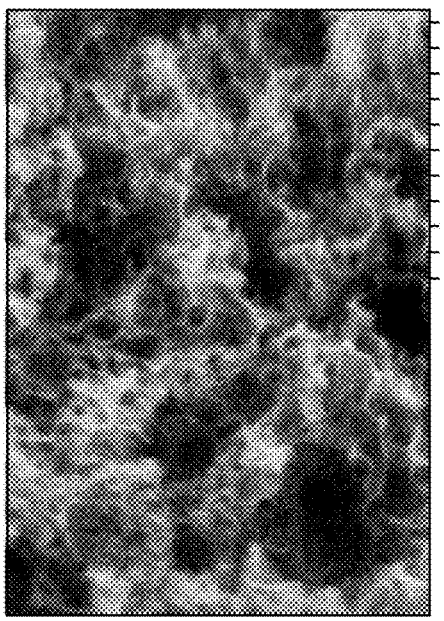
FIG. 12B is an SEM image of a bi-modal catalyst derived from Fe-AAPyr and LM130 silica with a scale bar at 300 nm.
Figure 12A:
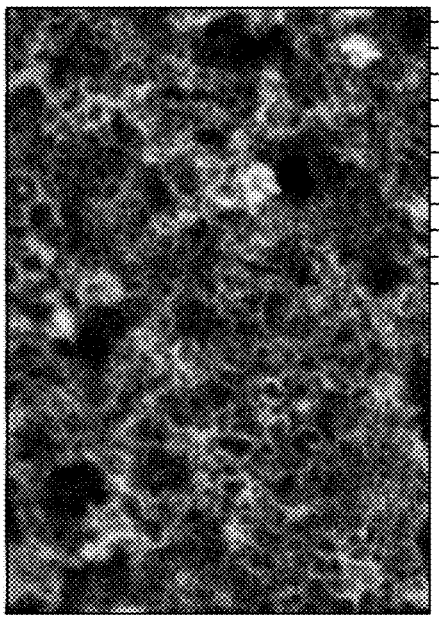
FIG. 12A is an SEM image of a bi-modal catalyst derived from Fe-AAPyr and LM130 silica with a scale bar at 500 nm.

FIG. 12 is an SEM image of a bi-modal catalyst derived from Fe-AAPyr and LM130 silica. It can be seen that first type of pores have diameter ~100 nm, while second type of pores have diameter ~30 nm.

Figure 13A:
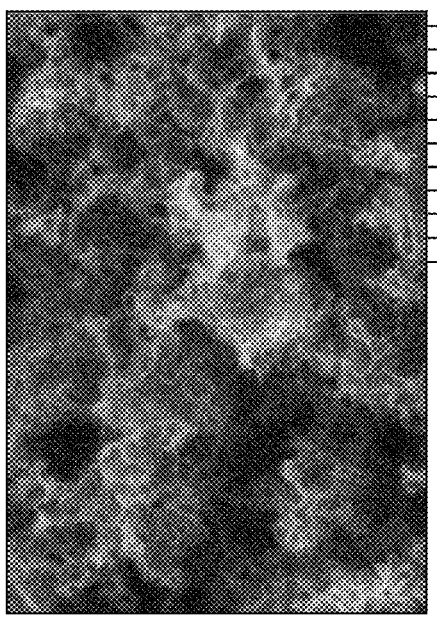
FIG. 13A is an SEM image of a catalyst derived from Fe-AAPyr and A90 silica with a scale bar at 500 nm.
Figure 13B:
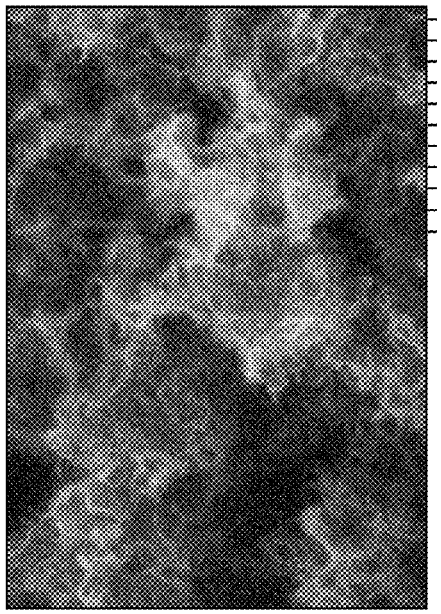
FIG. 13B is an SEM image of a catalyst derived from Fe-AAPyr and A90 silica with a scale bar at 300 nm.

FIG. 13 is an SEM image of a catalyst derived from Fe-AAPyr and A90 silica. It can be seen that pores have diameter ~30 nm, while there is also nano-channels with diameter 40-60 nm.

Figure 14:
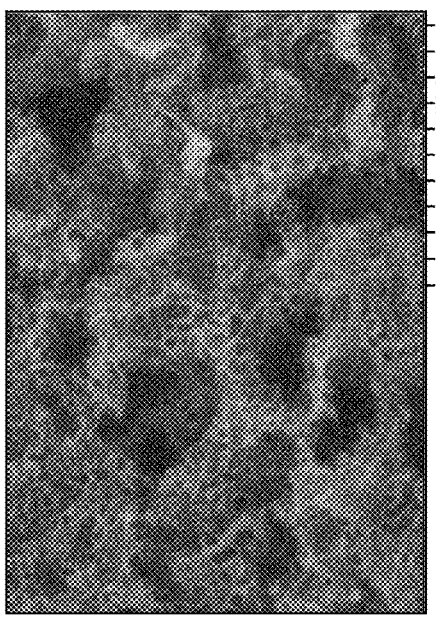
FIG. 14 is an SEM image of a bi-modal catalyst derived from Fe-AAPyr and mixture of L90 and A90 silicas.

FIG. 14 is an SEM image of a bi-modal catalyst derived from Fe-AAPyr and mixture of L90 and A90 silicas. It can be seen that first type of pores have diameter ~150 nm, while second type of pores have diameter ~20 nm.

Figure 15A:
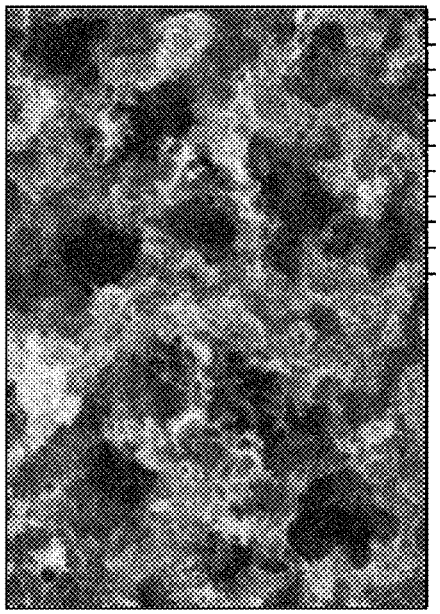
FIG. 15A is an SEM image of a tri-modal catalyst derived from Fe-AAPyr and mixture of L90 and EH5 silicas with a scale bar at 500 nm.
Figure 15C:
FIG. 15C is an SEM image of a tri-modal catalyst derived from Fe-AAPyr and mixture of L90 and EH5 silicas with a scale bar at 300 nm.
Figure 15B:
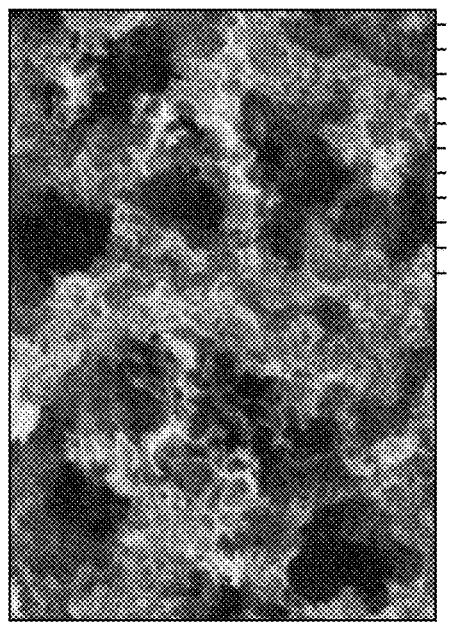
FIG. 15B is an SEM image of a tri-modal catalyst derived from Fe-AAPyr and mixture of L90 and EH5 silicas with a scale bar at 400 nm.

FIG. 15 is an SEM image of a tri-modal catalyst derived from Fe-AAPyr and mixture of L90 and EH5 silicas. It can be seen that first type of pores have diameter ~150-200 nm, second type of pores have diameter ~40-60 nm, and third is about 20 nm.

Figure 16:
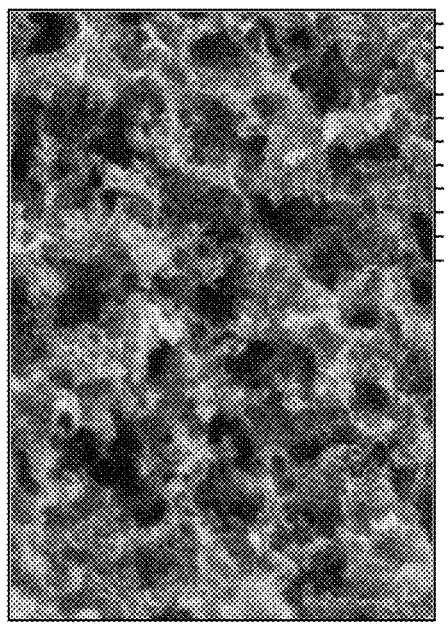
FIG. 16 is an SEM image of a bi-modal catalyst derived from Fe-AAPyr and mixture of L90 and M5 silicas with a scale bar at 500 nm.

FIG. 16 is an SEM image of a bi-modal catalyst derived from Fe-AAPyr and mixture of L90 and M5 silicas. It can be seen that first type of pores have diameter ~100 nm, while second type of pores have diameter ~25 nm.

Figure 17:
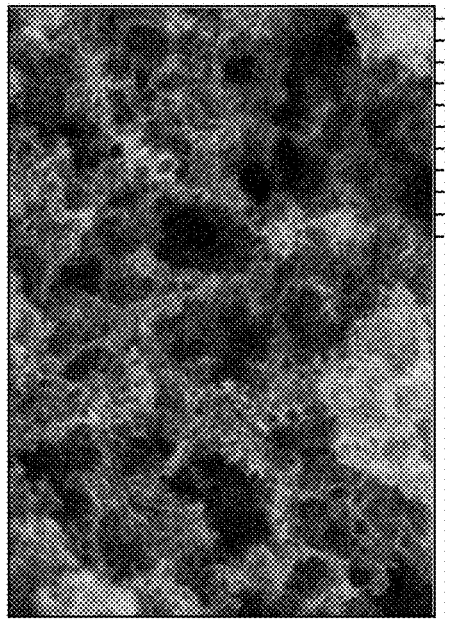
FIG. 17 is an SEM image of a bi-modal catalyst derived from Fe-AAPyr and mixture of L90 and LM130 silicas with a scale bar at 500 nm.

FIG. 17 is an SEM image of a bi-modal catalyst derived from Fe-AAPyr and mixture of L90 and LM130 silicas. It can be seen that first type of pores have diameter ~150-200 nm, while second type of pores have diameter ~30 nm.

Figure 18:
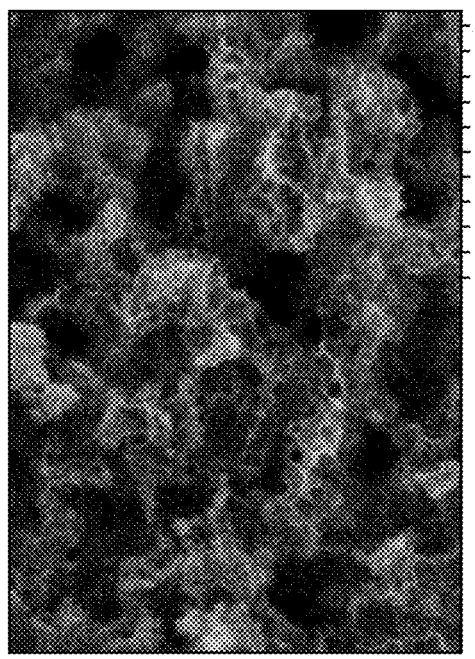
FIG. 18 is an SEM image of a bi-modal catalyst derived from Fe-AAPyr and mixture of L90 and A200 silicas.
Figure 20A:
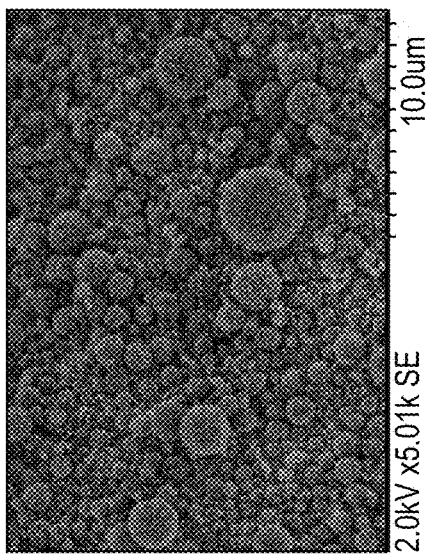
FIG. 20A is an SEM image of a spherical catalyst derived from Fe-AAPyr and M5 silica.
Figure 20C:
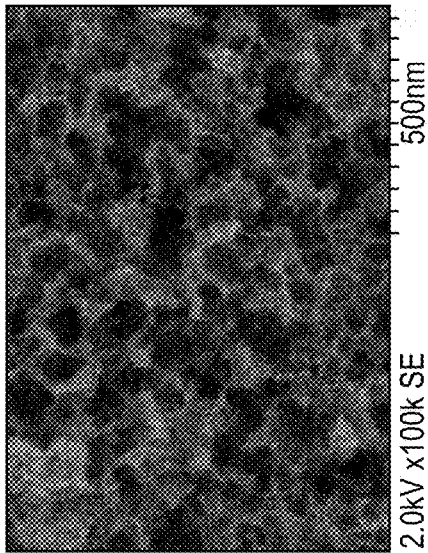
FIG. 20C is another SEM image of a spherical catalyst derived from Fe-AAPyr and M5 silica.
Figure 20D:
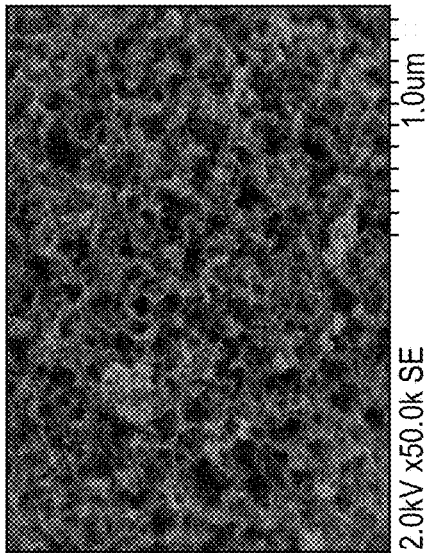
FIG. 20D is another SEM image of a spherical catalyst derived from Fe-AAPyr and M5 silica.

FIG. 18 is an SEM image of a bi-modal catalyst derived from Fe-AAPyr and mixture of L90 and A200 silicas. It can be seen that first type of pores have diameter ~100-200 nm, while second type of pores have diameter ~50 nm.

Figure 19:
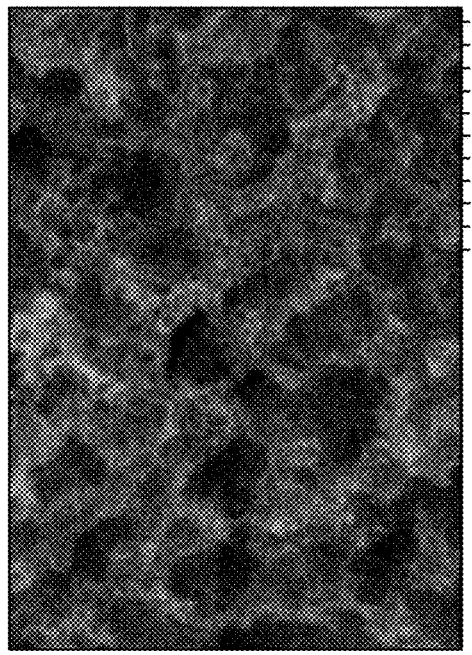
FIG. 19 is an SEM image of a bi-modal catalyst derived from Fe-AAPy and mixture of L90 and A380 silicas.
Figure 20B:
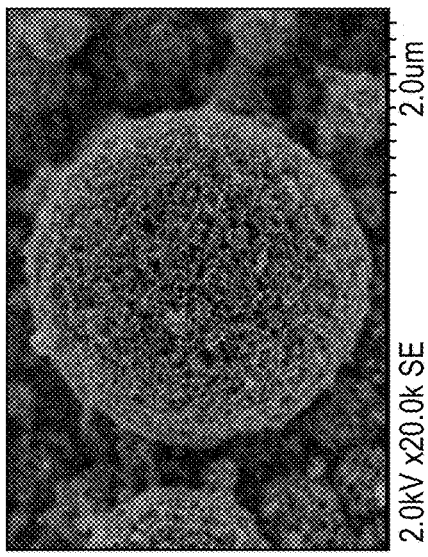
FIG. 20B is another SEM image of a spherical catalyst derived from Fe-AAPyr and M5 silica.

FIG. 19 is an SEM image of a bi-modal catalyst derived from Fe-AAPy and mixture of L90 and A380 silicas. It can be seen that first type of pores have diameter ~100 nm, while second type of pores have diameter <20 nm.

FIG. 20 is an SEM image of a spherical catalyst derived from Fe-AAPyr and M5 silica. It can be seen that spheres of catalyst are in the range of 1-3 μm, while pores have diameter about 50-70 nm.

FIGS. 21-25 show the results of oxygen reduction tests on a selection of the multi-modal catalysts in FIGS. 10-20 and thus demonstrate the utility of the materials described herein.

Figure 21:
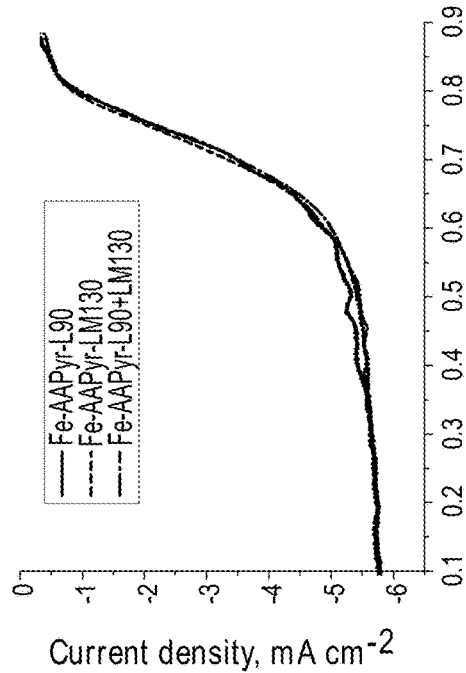
FIG. 21 is a Rotating Disc Electrode electro-voltamogram illustrating oxygen reduction for RDE data for catalysts prepared from Fe-AAPyr and HS5, L90 and L90+EH5 silicas.

FIG. 21 is a Rotating Disc Electrode electro-voltamogram illustrating oxygen reduction for RDE data for catalysts prepared from Fe-AAPyr and HS5, L90 and L90+EH5 silicas in 0.5M $H_2SO_4$ saturated with $O_2$ (catalysts loading: 600 mg $cm^{-2}$, 1200 RPM, 5 mV $s^{-1}$).

Figure 22:
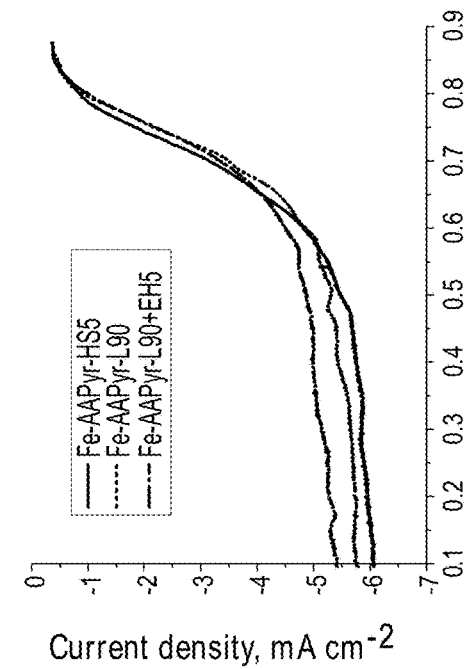
FIG. 22 is a Rotating Disc Electrode electro-voltamogram illustrating oxygen reduction for RDE data for catalysts prepared from Fe-AAPyr and L90, LM130, and L90+LM130 silicas.

FIG. 22 is a Rotating Disc Electrode electro-voltamogram illustrating oxygen reduction for RDE data for catalysts prepared from Fe-AAPyr and L90, LM130, and L90+LM 130 silicas in 0.5M $H_2SO_4$ saturated with $O_2$ (catalysts loading: 600 mg $cm^{-2}$, 1200 RPM, 5 mV $s^{-1}$).

Figure 23:
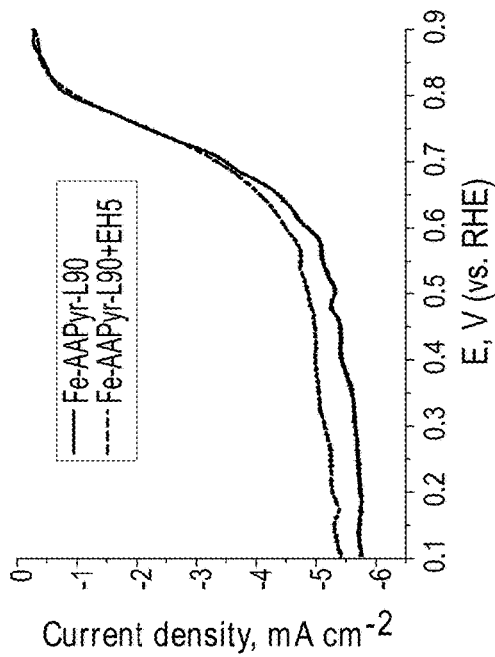
FIG. 23 is a Rotating Disc Electrode electro-voltamogram illustrating oxygen reduction for RDE data for catalysts prepared from Fe-AAPyr and L90, L90+A90, and A90 silicas.

FIG. 23 is a Rotating Disc Electrode electro-voltamogram illustrating oxygen reduction for RDE data for catalysts prepared from Fe-AAPyr and L90, L90+A90, and A90 silicas in 0.5M $H_2SO_4$ saturated with $O_2$ (catalysts loading: 600 mg $cm^{-2}$, 1200 RPM, 5 mV $s^{-1}$).

Figure 24:
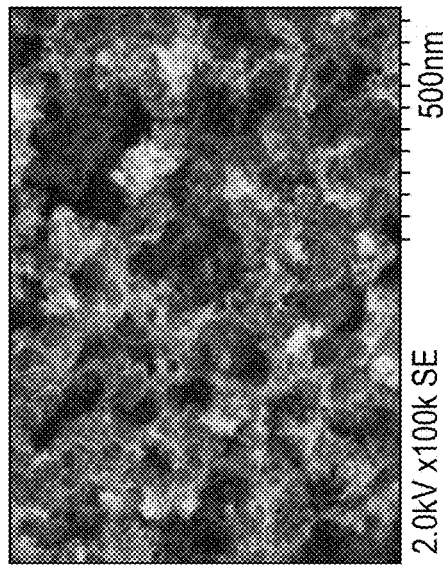
FIG. 24 is a Rotating Disc Electrode electro-voltamogram illustrating oxygen reduction for RDE data for catalysts prepared from Fe-AAPyr and L90 and L90+EH5 silicas.

FIG. 24 is a Rotating Disc Electrode electro-voltamogram illustrating oxygen reduction for RDE data for catalysts prepared from Fe-AAPyr and L90 and L90+EH5 silicas in 0.5M $H_2SO_4$ saturated with $O_2$ (catalysts loading: 600 mg $cm^{-2}$, 1200 RPM, 5 mV $s^{-1}$).

Figure 25:
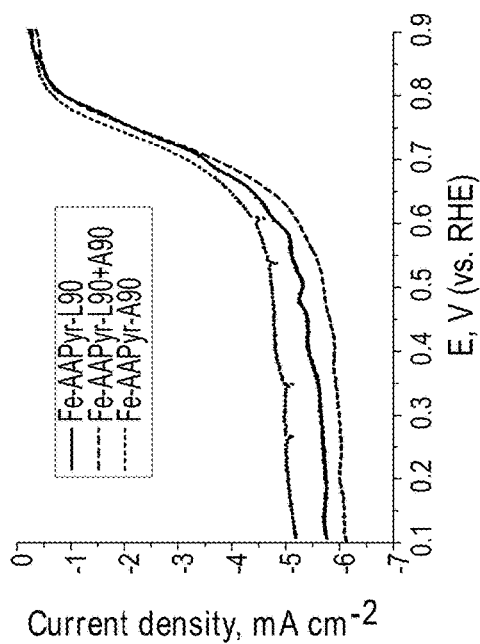
FIG. 25 is a Rotating Disc Electrode electro-voltamogram illustrating oxygen reduction for RDE data for catalysts prepared from Fe-AAPyr and L90, M5 and L90+M5 silicas.

FIG. 25 is a Rotating Disc Electrode electro-voltamogram illustrating oxygen reduction for RDE data for catalysts prepared from Fe-AAPyr and L90, M5 and L90+M5 silicas in 0.5M $H_2SO_4$ saturated with $O_2$ (catalysts loading: 600 mg $cm^-$, 1200 RPM, 5 mV $s^{-1}$).

It will be appreciated that some in some applications a mono-metallic catalyst may not be sufficiently stable or active to replace traditional platinum- or platinum alloy-based catalysts. Accordingly, as indicated above, according to some embodiments, the presently described method may incorporate the use of precursors of multiple metals in order to achieve a desired stability and/or activity.

According to various specific embodiments, Fe-AAPyr catalysts were prepared via wet impregnation of iron and second transition metal, or iron, second and third transition metal (transition metals=Co, Ni, Cu, Cr and Mn) and amino-antipyrine precursors onto the surface of fumed silica (Cab-O-Sil™ EH-5, surface area: ~400 $m^2$ $g^{-1}$). First, a 1 g of silica was dispersed in water using the sonobath. Then, a solution of 1 g of AAPyr in water was added to silica, and sonicated for 20 minutes. Then, an aqueous solution of 1 g iron nitrate ($Fe(NO_3)_3 \cdot 9H_2O$, Sigma-Aldrich) and 1 g of manganese nitrate was added to the $SiO_2$-AAPyr solution and then sonicated for 8 hours in the sonobath. After sonication, a viscous solution of silica and Fe—Mn-AApyr was dried overnight at T=85° C. The solid was ground to a fine powder in an agate mortar, and then subjected to the heat treatment (HT). The conditions of HT were: UHP $N_2$ atmosphere flowing at a rate of 100 cc $min^{-1}$, HT temperatures of 800° C., HT temperature ramp rates of 10° C. $min^{-1}$, and HT durations of 1 hour.

FIGS. 26-34 illustrate structural and morphological data for selected multi-metallic M-N—C catalyst prepared by the above described methods.

Figure 26:
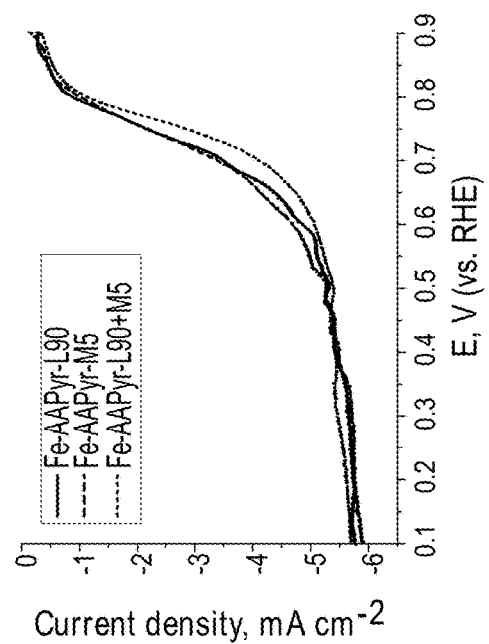
FIG. 26 is an SEM image of $Fe_3Co$-AAPyr catalyst prepared using the methods described herein.
Figure 27:
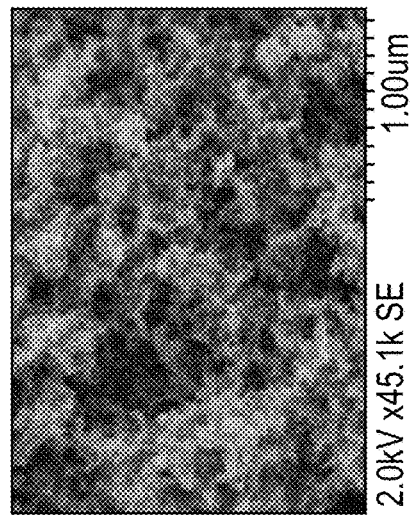
FIG. 27 is an SEM image of FeCo-AAPyr catalyst prepared using the methods described herein.
Figure 28:
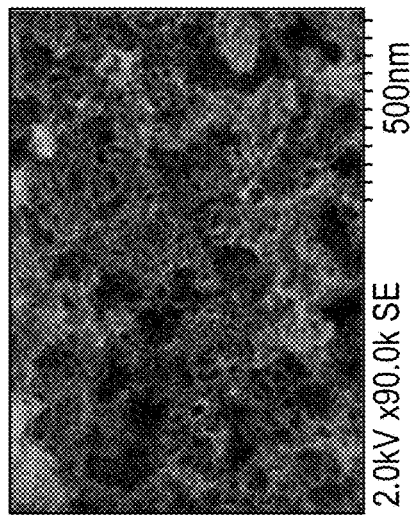
FIG. 28 is an SEM image of $FeCo_3$-AAPyr catalyst prepared using the methods described herein.

FIGS. 26-28 show three different catalysts $Fe_3Co$-AAPyr, FeCo-AAPyr and $FeCo_3$-AAPyr, respectively, prepared using the methods described herein. The materials possess a highly developed porous structure with a pore size of about 100 nm.

Figure 29A:
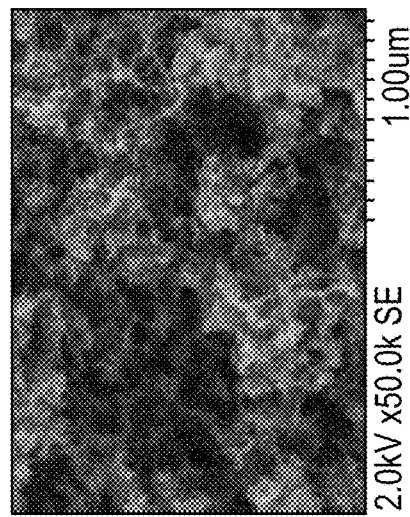
FIG. 29A is an SEM image of $FeCu_3$-AAPyr bi-metallic catalyst prepared using the methods described herein.
Figure 29B:
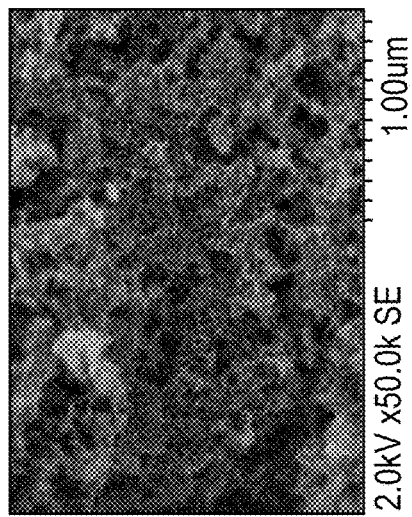
FIG. 29B is another SEM image of $FeCu_3$-AAPyr bi-metallic catalyst prepared using the methods described herein.

FIGS. 29A and B are SEM images of $FeCu_3$-AAPyr bi-metallic catalyst illustrating that this material possesses a highly developed porous structure with pore size about 70 nm.

Figure 30A:
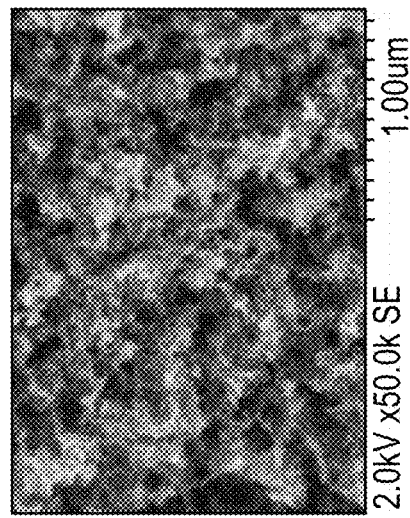
FIG. 30A is an SEM image of $FeMn_3$-AAPyr bi-metallic catalyst prepared using the methods described herein.
Figure 30B:
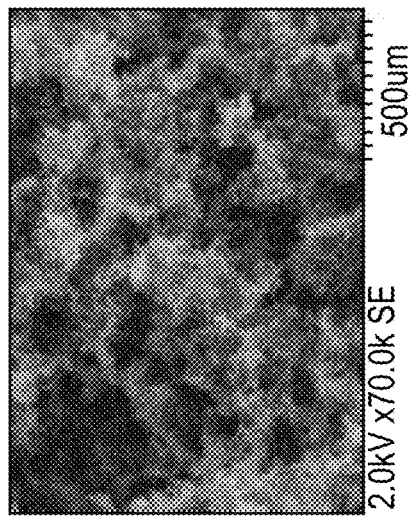
FIG. 30B is another SEM image of $FeMn_3$-AAPyr bi-metallic catalyst prepared using the methods described herein.

FIGS. 30A and B are SEM images of $FeMn_3$-AAPyr bi-metallic catalyst illustrating that this material possesses a highly developed porous structure with pore size about 50 nm.

Figure 31A:
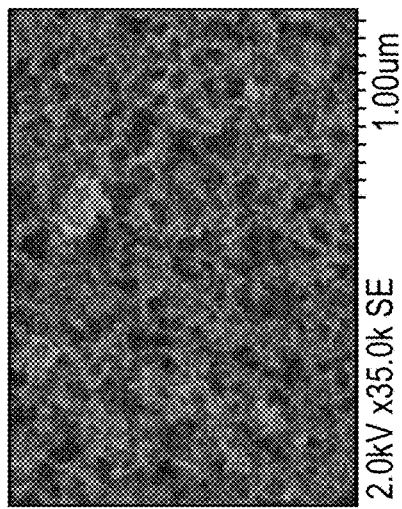
FIG. 31A is an SEM image of $FeNi_3$-AAPyr bi-metallic catalyst prepared using the methods described herein.
Figure 31B:
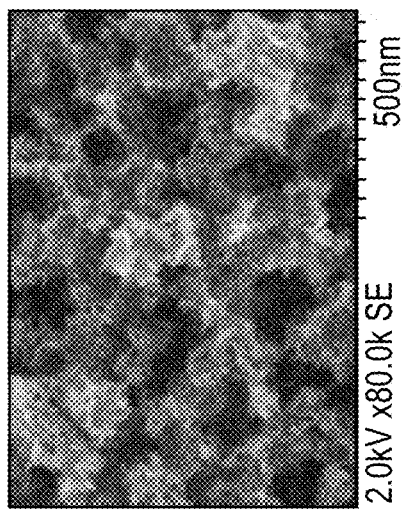
FIG. 31B is another SEM image of $FeNi_3$-AAPyr bi-metallic catalyst prepared using the methods described herein.

FIGS. 31A and B are SEM images of $FeNi_3$-AAPyr bi-metallic catalyst illustrating that this material possesses a highly developed porous structure with pore size about 200 nm.

Figure 32A:
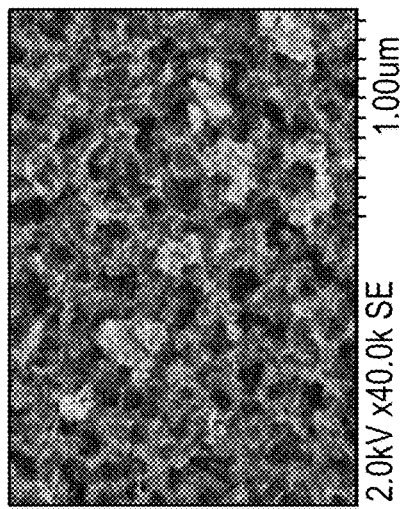
FIG. 32A is an SEM image of FeCoCu-AAPyr tri-metallic catalyst prepared using the methods described herein.
Figure 32B:
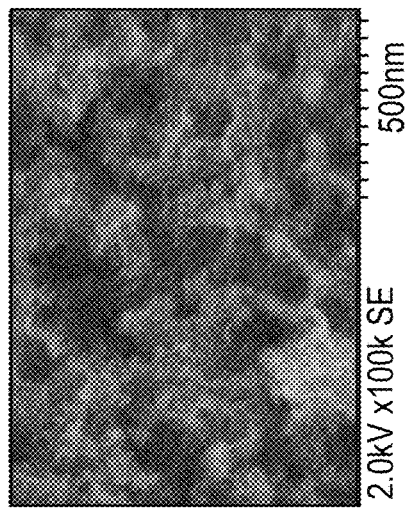
FIG. 32B is another SEM image of FeCoCu-AAPyr tri-metallic catalyst prepared using the methods described herein.

FIGS. 32A and B are SEM images of FeCoCu-AAPyr tri-metallic catalyst illustrating that this material possesses a highly developed porous structure with pore size about 150 nm.

Figure 33A:
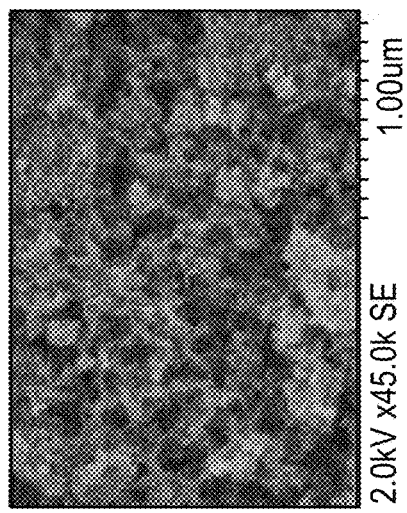
FIG. 33A is an SEM image of FeCoMn-AAPyr tri-metallic catalyst prepared using the methods described herein.
Figure 33B:
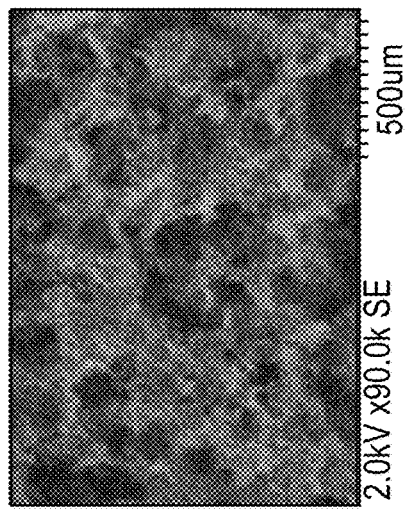
FIG. 33B is another SEM image of FeCoMn-AAPyr tri-metallic catalyst prepared using the methods described herein.

FIGS. 33A and B are SEM images of FeCoMn-AAPyr tri-metallic catalyst illustrating that this material possesses a highly developed porous structure with pore size about 100 nm.

FIGS. 34A and B are SEM images of FeCuMn-AAPyr tri-metallic catalyst illustrating that this material possesses a highly developed porous structure with pore size about 100 nm.

The utility of the multi-metallic catalysts described herein is demonstrated by the results of oxygen reduction tests illustrated in FIGS. 35-40.

FIG. 35 is a Rotating Disc Electrode electro-voltamogram illustrating oxygen reduction for $Fe_xCo_y$-AAPyr bi-metallic catalysts compared to Co-AAPyr in 0.5M $H_2SO_4$ saturated with $O_2$ (catalyst loading: 600 mg $cm^{-2}$, 1200 RPM, 5 mV $s^{-1}$).

FIG. 36 is a Rotating Disc Electrode electro-voltamogram illustrating oxygen reduction for $Fe_xNi_y$-AAPyr bi-metallic catalysts compared to Ni-AAPyr in 0.5M $H_2SO_4$ saturated with $O_2$ (catalyst loading: 600 mg $cm^{-2}$, 1200 RPM, 5 mV $s^{-1}$).

Figure 37:
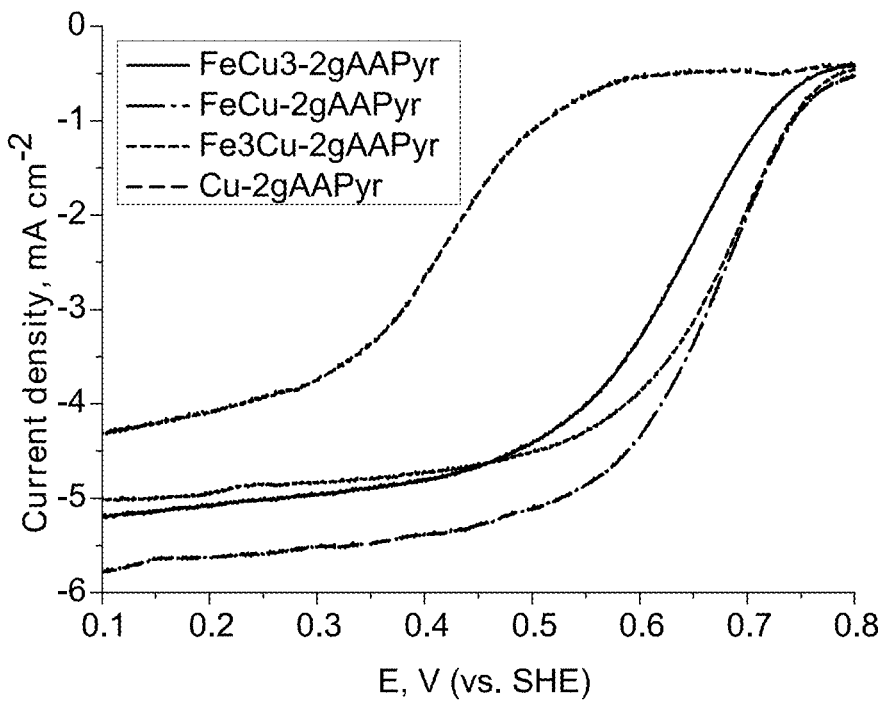
FIG. 37 is a Rotating Disc Electrode electro-voltamogram illustrating oxygen reduction for $Fe_xCu_y$-AAPyr bi-metallic catalysts compared to Cu-AAPyr.

FIG. 37 is a Rotating Disc Electrode electro-voltamogram illustrating oxygen reduction for $Fe_xCu_y$-AAPyr bi-metallic catalysts compared to Cu-AAPyr in 0.5M $H_2SO_4$ saturated with $O_2$ (catalyst loading: 600 mg $cm^{-2}$, 1200 RPM, 5 mV $s^{-1}$).

Figure 38:
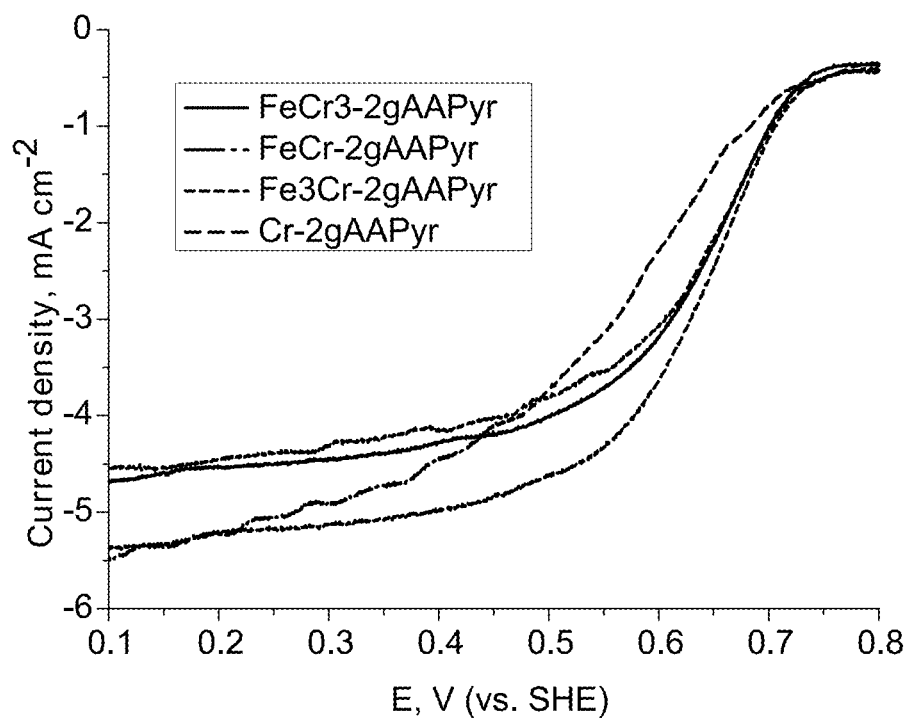
FIG. 38 is a Rotating Disc Electrode electro-voltamogram illustrating oxygen reduction for $Fe_xCr_y$-AAPyr bi-metallic catalysts compared to Cr-AAPyr.

FIG. 38 is a Rotating Disc Electrode electro-voltamogram illustrating oxygen reduction for $Fe_xCr_y$-AAPyr bi-metallic catalysts compared to Cr-AAPyr in 0.5M $H_2SO_4$ saturated with $O_2$ (catalyst loading: 600 mg $cm^{-2}$, 1200 RPM, 5 mV $s^{-1}$).

Figure 39:
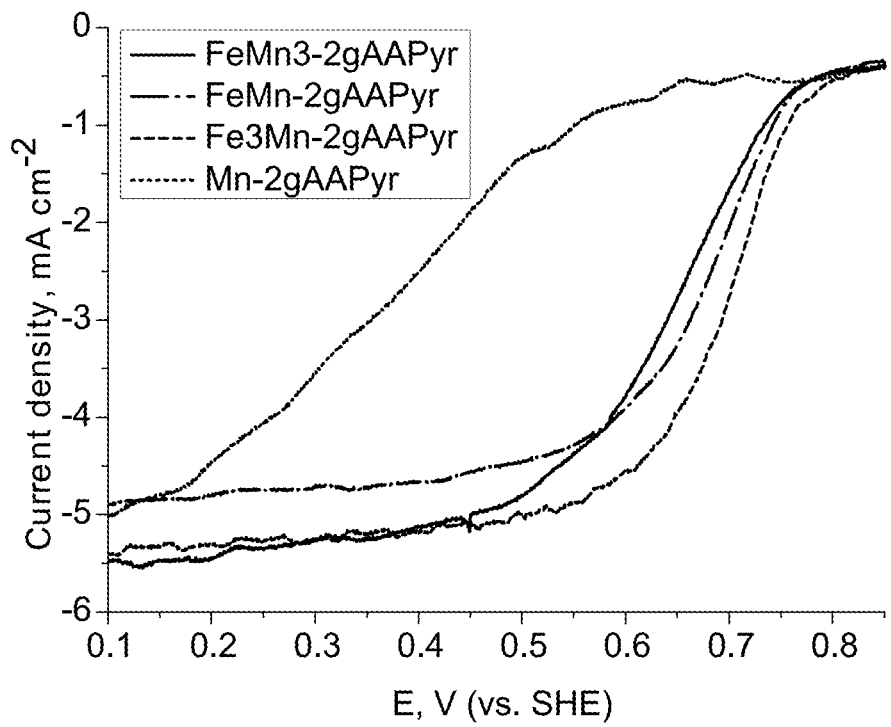
FIG. 39 is a Rotating Disc Electrode electro-voltamogram illustrating oxygen reduction for $Fe_xMn_y$-AAPyr bi-metallic catalysts compared to Mn-AAPyr.

FIG. 39 is a Rotating Disc Electrode electro-voltamogram illustrating oxygen reduction for Fe$_x$Mn$_y$-AAPyr bi-metallic catalysts compared to Mn-AAPyr in 0.5M H$_2$SO$_4$ saturated with O$_2$ (catalyst loading: 600 mg cm$^{-2}$, 1200 RPM, 5 mV s$^{-1}$).

Figure 40:
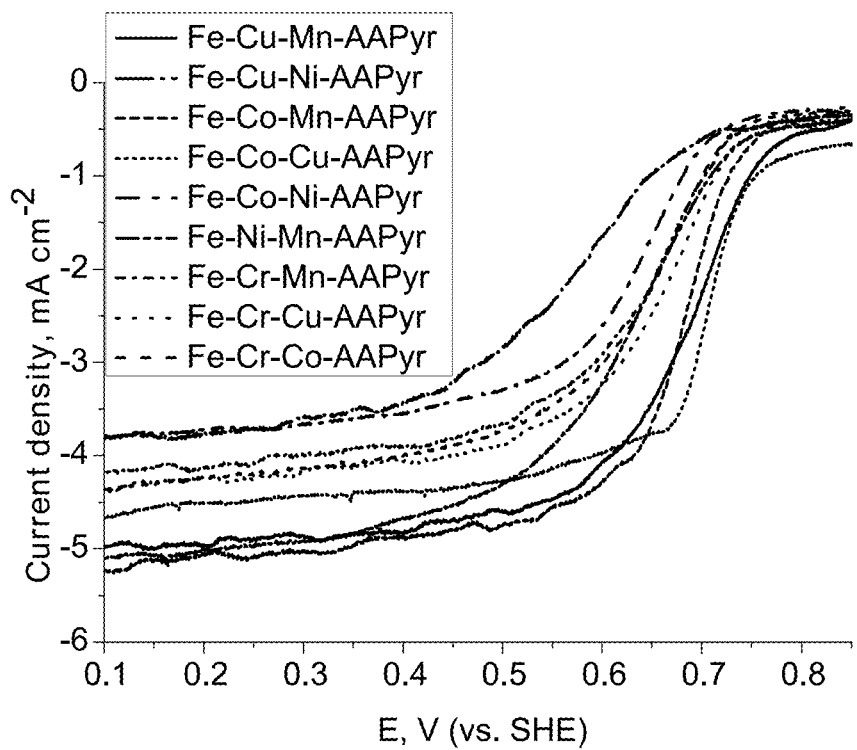
FIG. 40 is a Rotating Disc Electrode electro-voltamogram illustrating oxygen reduction for $FeM^IM^{II}$-AAPyr tri-metallic catalysts.

FIG. 40 is a Rotating Disc Electrode electro-voltamogram illustrating oxygen reduction for FeM$^I$M$^{II}$ AAPyr tri-metallic catalysts in 0.5M H$_2$SO$_4$ saturated with O$_2$ (catalyst loading: 600 mg cm$^{-2}$, 1200 RPM, 5 mV s$^{-1}$).

These reaction tests demonstrate that the multi-metallic M-N—C catalysts prepared from inexpensive C—N precursors using the methods described herein possess activity significantly higher than mono-metallic catalysts. Such high activity makes these materials suitable for us in fuel cell applications as cathode catalysts as they possess high activity in ORR in alkaline, neutral, and acid environments.

Figure 41:
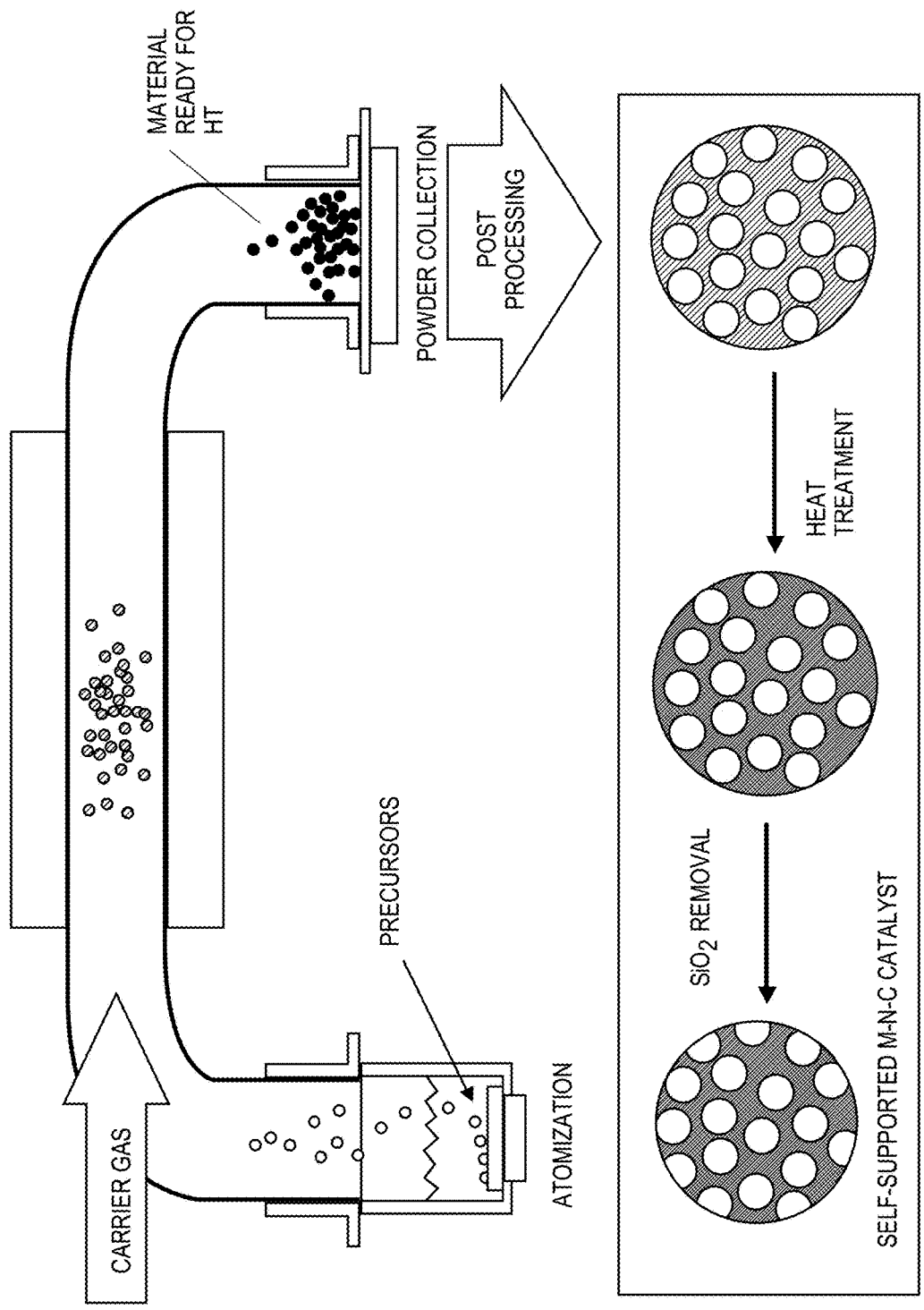
FIG. 41 is a schematic illustration of a batch-wise process for producing M-N—C catalysts according to the present disclosure.
Figure 42B:
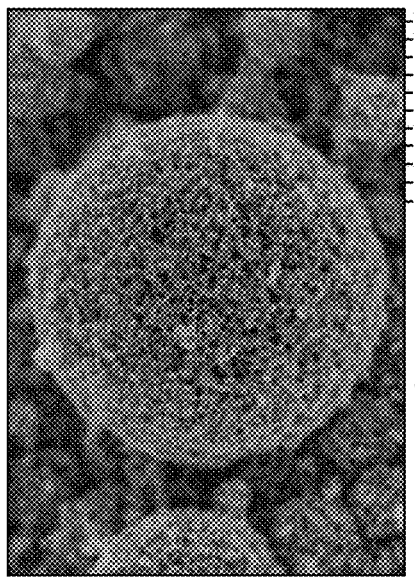
FIG. 42B is an SEM image of spherical, highly porous Fe—N—C catalysts prepared on low surface area silica with a scale bar at 2 µm.
Figure 42D:
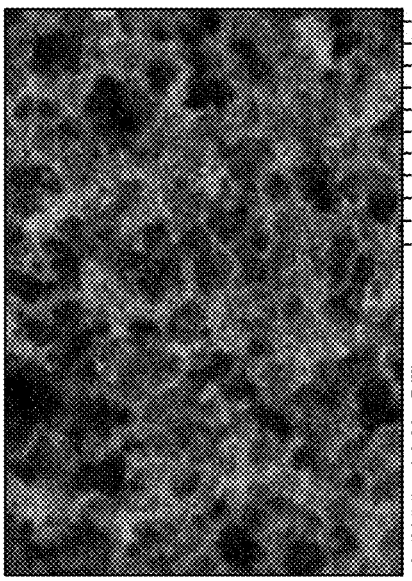
FIG. 42D is an SEM image of spherical, highly porous Fe—N—C catalysts prepared on low surface area silica with a scale bar at 500 nm.
Figure 42A:
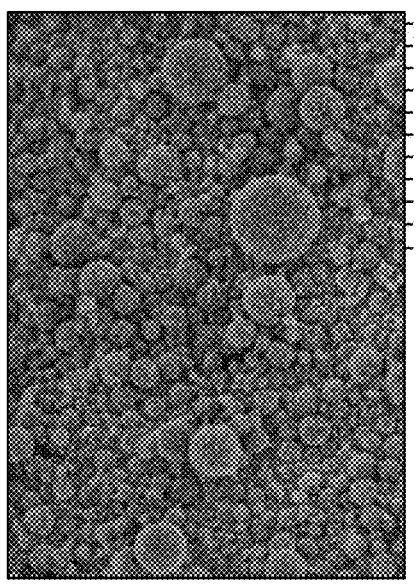
FIG. 42A is an SEM image of spherical, highly porous Fe—N—C catalysts prepared on low surface area silica with a scale bar at 10 µm.
Figure 42C:
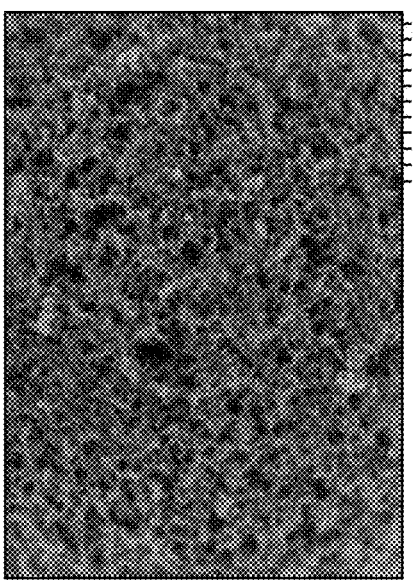
FIG. 42C is an SEM image of spherical, highly porous Fe—N—C catalysts prepared on low surface area silica with a scale bar at 1 µm.

According to some embodiments, it may be desirable to produce large amounts of the catalysts described herein, for example in a batch-wise process. Accordingly, the present disclosure further provides a method for large-scale preparation of the presently described catalysts. According to an embodiment, the present disclosure provides a method which combines a sacrificial support-based methodology with spray pyrolysis to produce self-supported catalysts. According to this method, the spray pyrolysis method is a continuous method while the sacrificial support-based methodology is performed batch-wise. Turning to FIG. 41, it can be seen that the precursor materials described above are mixed with a silica support, atomized, and dried in a tube furnace. The powder obtained from this procedure is then collected on a filter. The collected powder is then heat treated, as needed, depending on the desired application of the catalyst. Finally, the sacrificial support is removed, for example by leaching with HF or KOH.

It will be appreciated that the above-described large-scale production method is suitable for use for a wide variety of precursors and materials and thus not necessarily limited to the catalysts disclosed herein. FIGS. 42-44 illustrate morphological data for selected self-supported metal-nitrogen-carbon (M-N—C) catalyst prepared by the above described method.

FIGS. 42A-D are SEM images of spherical, highly porous Fe—N—C catalysts prepared on low surface area silica.

Figure 43B:
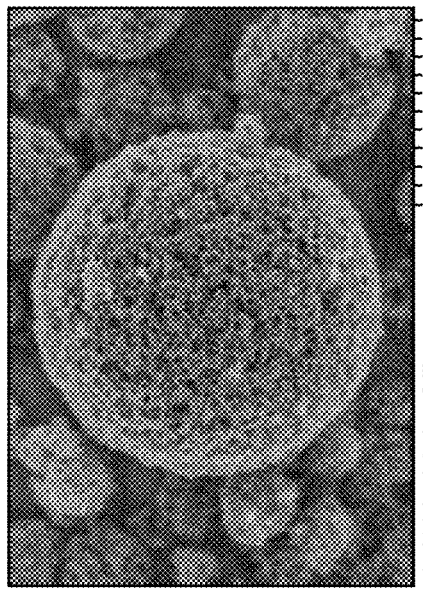
FIG. 43B is an SEM image of the first batch of spherical, highly porous Fe—N—C catalysts prepared on high surface area silica with a scale bar of 2 µm.
Figure 44A:
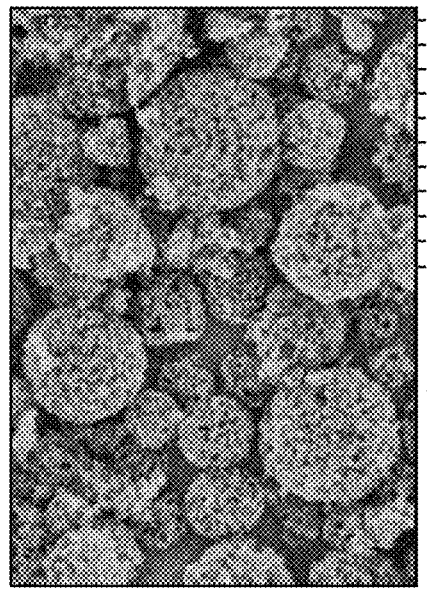
FIG. 44A is an SEM image of a second batch of spherical, highly porous Fe—N—C catalysts prepared on high surface area silica with a scale bar of 3 µm.
Figure 43A:
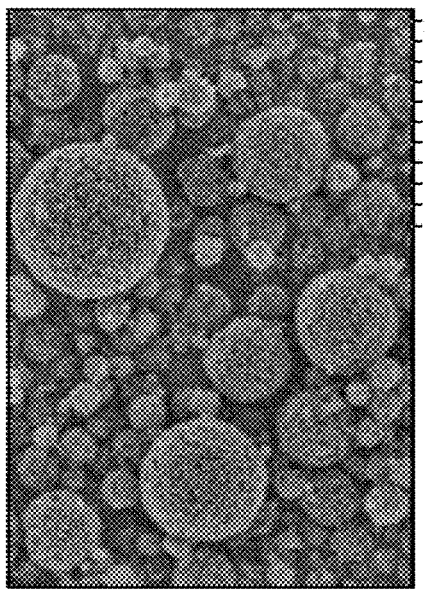
FIG. 43A is an SEM image of a first batch of spherical, highly porous Fe—N—C catalysts prepared on high surface area silica with a scale bar of 5 µm.
Figure 43C:
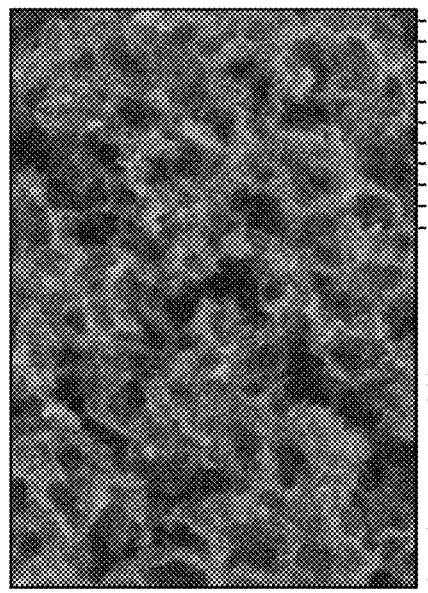
FIG. 43C is an SEM image of the first batch of spherical, highly porous Fe—N—C catalysts prepared on high surface area silica with a scale bar of 500 nm.
Figure 44B:
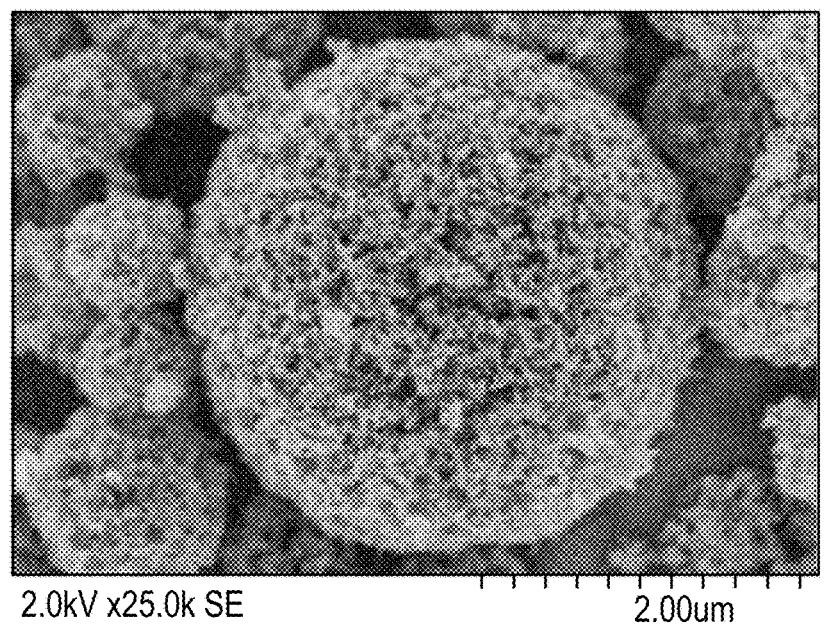
FIG. 44B is an SEM image of a second batch of spherical, highly porous Fe—N—C catalysts prepared on high surface area silica with a scale bar of 2 µm.

FIGS. 43A-C are SEM images of spherical, highly porous Fe—N—C catalysts prepared on high surface area silica (Batch 1).

FIG. 44 is an SEM image of spherical, highly porous Fe—N—C catalysts prepared on high surface area silica (Batch 2).

Figure 45:
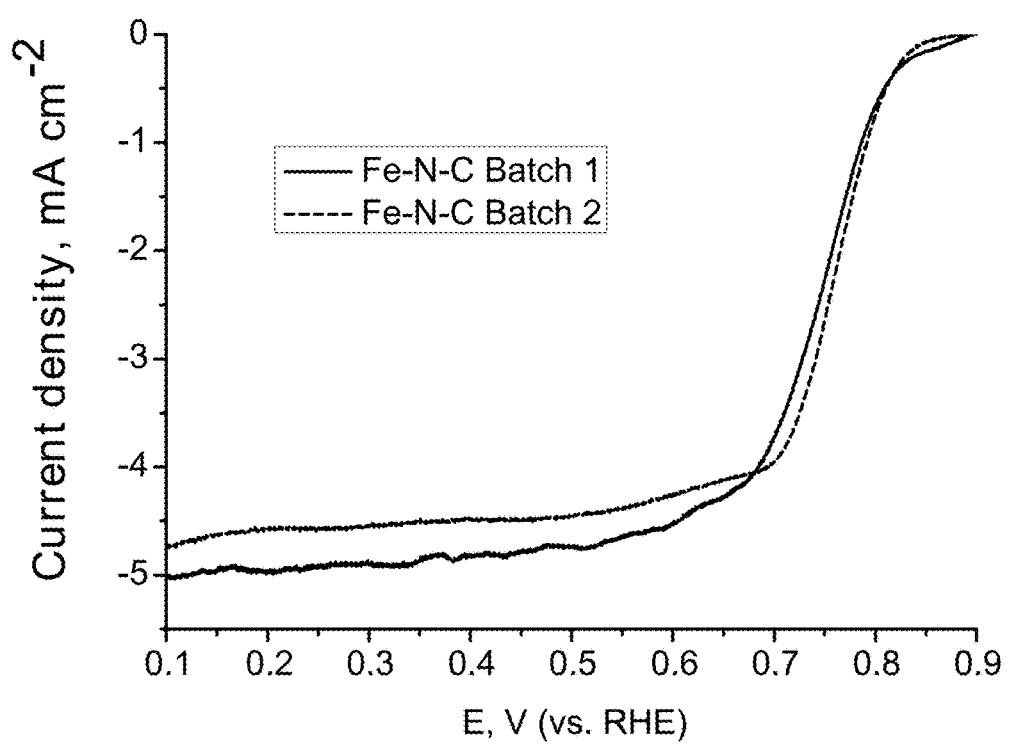
FIG. 45 is a Rotating Disc Electrode electro-voltamogram illustrating oxygen reduction for RDE data for spherical F—N—C catalysts prepared by the presently described method in 0.5M $H_2SO_4$ saturated with $O_2$ (catalysts loading: 600 µg $cm^{-2}$, 1200 RPM, 5 mV $s^{-1}$).

FIG. 45 is a Rotating Disc Electrode electro-voltamogram illustrating oxygen reduction for RDE data for spherical F—N—C catalysts prepared by the presently described method in 0.5M H$_2$SO$_4$ saturated with O$_2$ (catalysts loading: 600 μg cm$^{-2}$, 1200 RPM, 5 mV s$^{-1}$).

It can clearly be seen that the morphological properties of the materials are very consistent from batch to batch. The utility of these materials is illustrated in oxygen reduction tests, an example of which is shown in FIG. 5.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

What is claimed is:

1. A method for producing an electrocatalytic material suitable for use in a fuel cell comprising:
   providing at least two populations of sacrificial template particles wherein each population has an average particle diameter that is different from the other populations;
   precipitating one or more transition metal precursors and a non-porphyrin precursor with no initial catalytic activity onto the sacrificial template particles to produce dispersed precursors;
   pyrolyzing the dispersed precursors; and
   removing the sacrificial template particles to produce a dispersed, self-supported, electrocatalytic material having a multimodal pore distribution.

2. The method of claim 1 wherein the non-porphyrin precursor forms a complex with iron.

3. The method of claim 1 wherein the non-porphyrin precursor is 4-aminoantipirine.

4. The method of claim 1 wherein the transition metal precursor is an iron precursor.

5. The method of claim 1 wherein the one or more transitional metal precursors is selected from the group consisting of precusors of Ce, Cr, Cu, Mo, Ni, Ru, Ta, Ti, V, W, and Zr.

6. The method of claim 1 wherein at least two different metal precursors are used resulting in a multi-metallic catalyst.

7. The method of claim 1 wherein the wherein the sacrificial template particles and non-porphyrin precursors are selected for use so as to shift the reaction mechanism of the electrocatalytic material towards the 4 e-pathway.

8. The method of claim 1 wherein the electrocatalytic material contains a population of pores having an average diameter between 20 and 60 nm and a second population of pores having an average diameter between 100 and 200 nm.

9. The method of claim 8 wherein the sacrificial template particles are formed from silica.

10. The method of claim 9 wherein each population of silica particles is formed from a different type of silica.

11. The method of claim 1 further comprising
mixing the transition metal and non-porphyrin precursors with the sacrificial template particles;
atomizing the mixture to form a powder;
collecting the powder; and
heat treating the powder.

12. A dispersed, unsupported, catalytic material substantially consisting of nitrogen and carbon from a non-porphyrin precursor with no initial catalytic activity and at least one transition metal from pyrolyzed metal precursors manufactured using the method of claim 1.

13. A dispersed, unsupported, catalytic material substantially consisting of nitrogen and carbon from a non-porphyrin precursor with no initial catalytic activity and at least one transition metal from pyrolyzed metal precursors wherein the material comprises a first population of pores having an average diameter between 20 and 60 nm and a second population of pores having an average diameter between 100 and 200 nm.

14. The material of claim 13 further comprising a trimodal pore distribution wherein the material comprises a first population of pores having an average diameter of less than or approximately equal to 20 nm, a second population of pores having an average diameter of between approximately 40 and 60 nm, and a third population of pores having an average diameter between 150 and 200 nm.

15. The material of claim 13 comprising multiple transition metals.

16. A method for producing an electrocatalytic material suitable for use in a fuel cell comprising:
providing sacrificial template particles;
precipitating one or more transition metal precursors and 4-aminoantipirine onto the sacrificial template particles to produce dispersed precursors;
pyrolyzing the dispersed precursors; and
removing the sacrificial template particles to produce a dispersed, self-supported, electrocatalytic material.

* * * * *